(12) United States Patent
Mizuno et al.

(10) Patent No.: US 9,678,097 B2
(45) Date of Patent: Jun. 13, 2017

(54) ANGLE DETECTION DEVICE AND ANGLE DETECTION METHOD

(71) Applicant: FUJITSU SEMICONDUCTOR LIMITED, Yokohama-shi, Kanagawa (JP)

(72) Inventors: Hiroo Mizuno, Kawasaki (JP); Akira Shimamura, Yokohama (JP); Takashi Arai, Machida (JP)

(73) Assignee: SOCIONEXT INC., Yokohama (JP)

( * ) Notice: Subject to any disclaimer, the term of this patent is extended or adjusted under 35 U.S.C. 154(b) by 428 days.

(21) Appl. No.: 14/473,690

(22) Filed: Aug. 29, 2014

(65) Prior Publication Data

US 2015/0073745 A1 Mar. 12, 2015

(30) Foreign Application Priority Data

Sep. 12, 2013 (JP) .................. 2013-189551

(51) Int. Cl.
| | |
|---|---|
| *G01P 3/00* | (2006.01) |
| *G01P 3/44* | (2006.01) |
| *G01D 3/036* | (2006.01) |
| *G01D 5/20* | (2006.01) |

(52) U.S. Cl.
CPC .............. *G01P 3/00* (2013.01); *G01D 3/0365* (2013.01); *G01P 3/44* (2013.01); *G01D 5/2073* (2013.01)

(58) Field of Classification Search
CPC .... G01P 3/00; G01P 3/44; G01B 5/24; G01D 3/0365; G01D 5/2073
See application file for complete search history.

(56) References Cited

U.S. PATENT DOCUMENTS

| | | | |
|---|---|---|---|
| 5,783,925 A | 7/1998 | Umemura et al. | |
| 6,507,713 B2 * | 1/2003 | Koide | ................ G03G 15/0131 |
| | | | 399/167 |
| 2006/0132338 A1 | 6/2006 | Katakura et al. | |
| 2009/0160687 A1 | 6/2009 | Nakazato et al. | |
| 2009/0201479 A1 * | 8/2009 | Arai | ..................... B23K 26/032 |
| | | | 355/67 |

FOREIGN PATENT DOCUMENTS

| | | |
|---|---|---|
| JP | 09-068439 A | 3/1997 |
| JP | 09-273942 A | 10/1997 |
| JP | 2002-243500 A | 8/2002 |

(Continued)

*Primary Examiner* — Elias Desta
(74) *Attorney, Agent, or Firm* — Arent Fox LLP

(57) ABSTRACT

An angle detection device includes: first and second rotation measuring instruments; an anomaly detection unit detecting occurrences of anomalies in the first and second rotation measuring instruments; and a switching interpolation unit configured to select a first angle signal and a first angular speed signal and output as a third angle signal and a third angular speed signal when the first rotation measuring instrument is normal, and to perform switching so that a second angle signal and a second angular speed signal are output as the third angle signal and the third angular speed signal while performing interpolation so that the difference between the first angle signal and the second angle signal is reduced stepwise if the second rotation measuring instrument is normal when an anomaly has occurred in the first rotation measuring instrument.

10 Claims, 16 Drawing Sheets

(56) References Cited

FOREIGN PATENT DOCUMENTS

| | | |
|---|---|---|
| JP | 2005-003620 A | 1/2005 |
| JP | 2005-114442 A | 4/2005 |
| JP | 2006-058232 A | 3/2006 |
| JP | 2009-150826 A | 7/2009 |
| JP | 2009-210281 A | 9/2009 |

\* cited by examiner

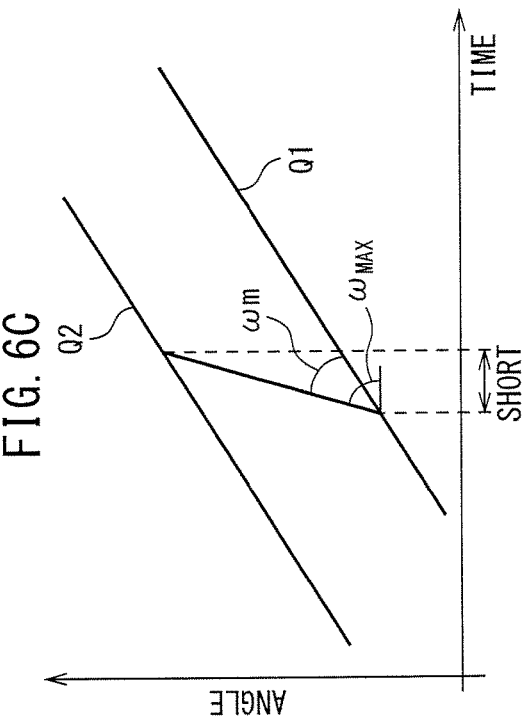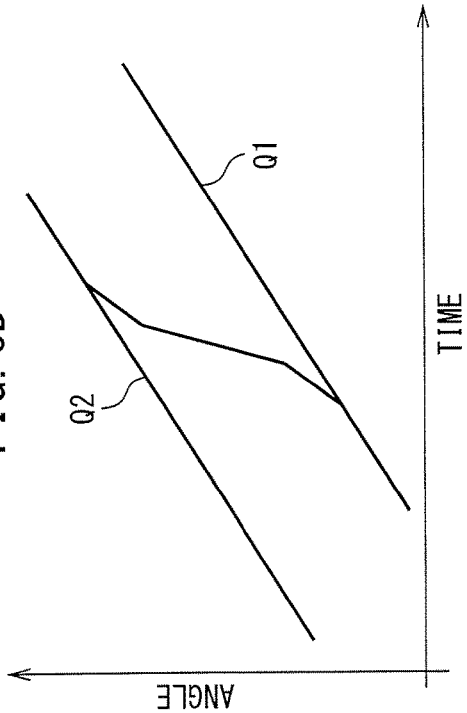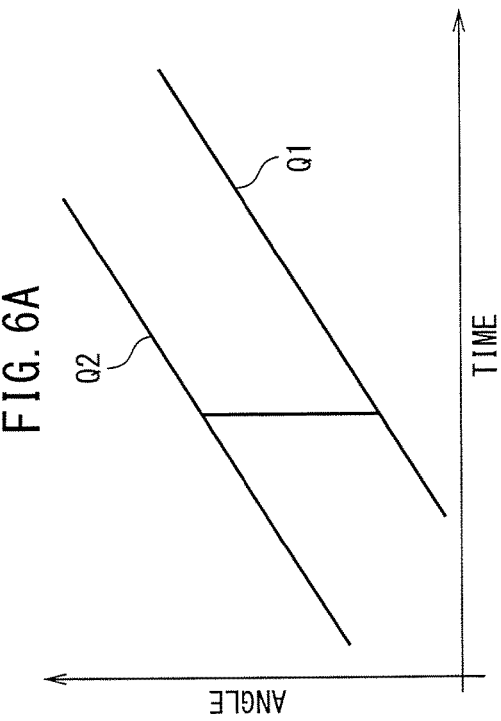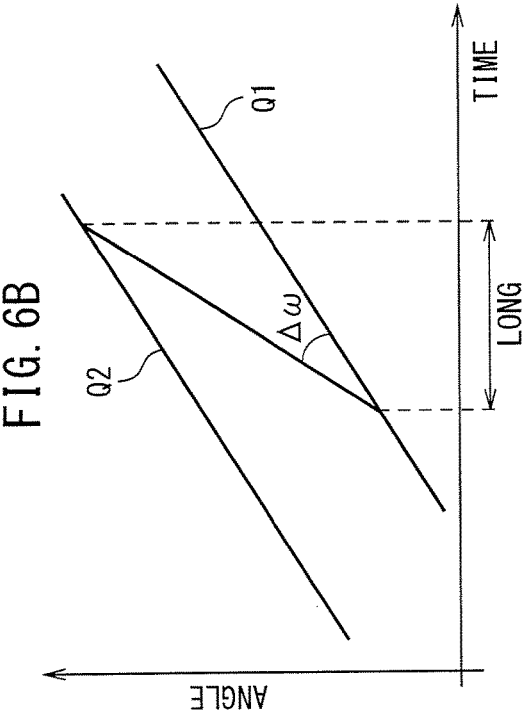

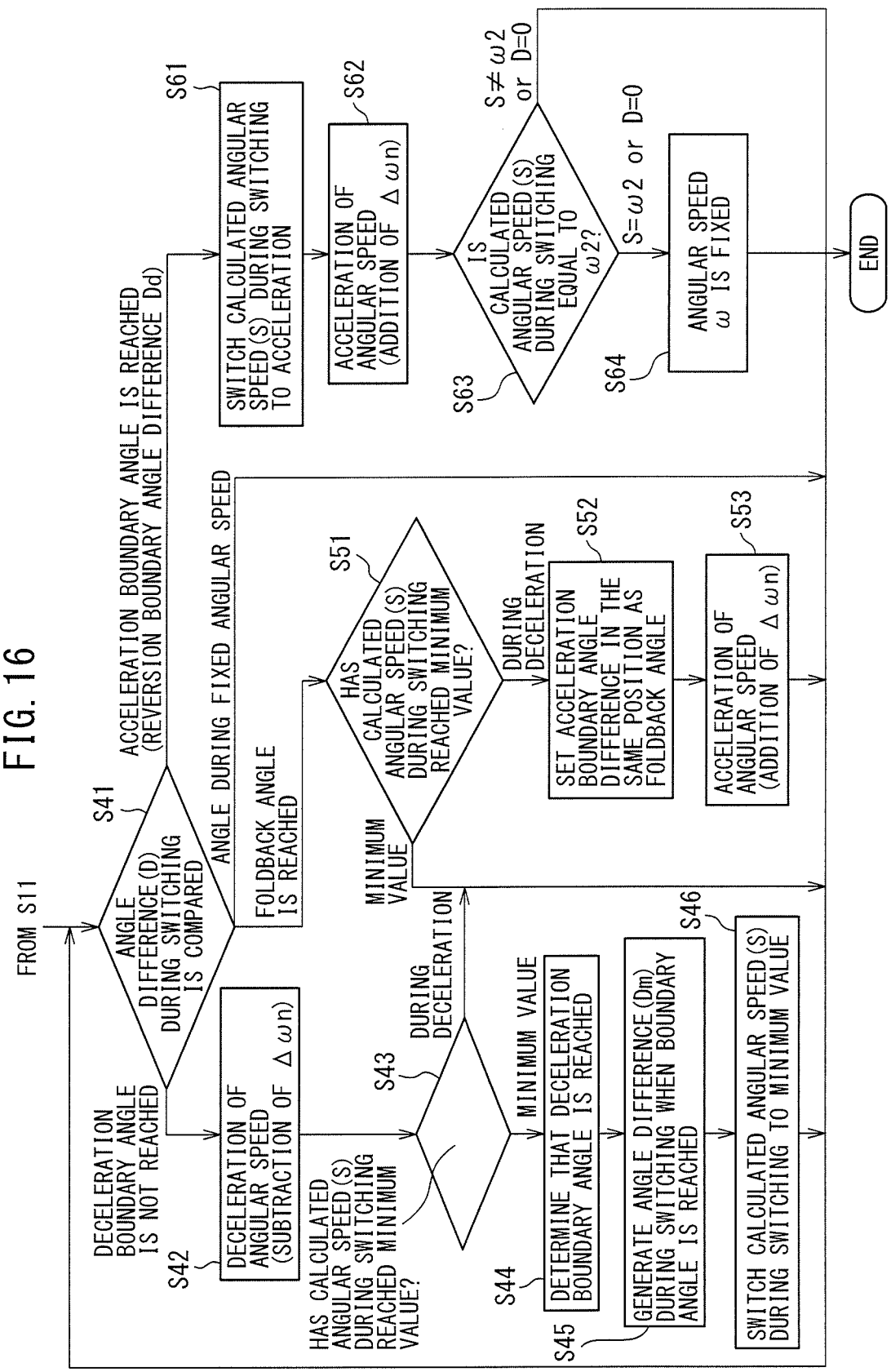

ANGLE DETECTION DEVICE AND ANGLE DETECTION METHOD

CROSS-REFERENCE TO RELATED APPLICATION

This application is based upon and claims the benefit of priority of the prior Japanese Patent Application No. 2013-189551, filed on Sep. 12, 2013, the entire contents of which are incorporated herein by reference.

FIELD

The technology disclosed herein relates to an angle detection device and an angle detection method.

BACKGROUND

It is known to measure a rotation angle and a rotation speed (angular speed) of a rotating machine (motor, etc.) using a rotation measuring instrument, such as a resolver. The measured rotation angle and rotation speed are used for servo control of a rotating machine.

The resolver outputs a signal obtained by modulating the amplitude of a reference signal supplied from a sine wave oscillator in accordance with the rotation angle of its rotor. The rotor of the resolver and that of the motor share a shaft and it is possible to measure the rotation angle of the motor based on the output signal of the resolver. In the following explanation, an example in which a resolver is used is explained; however, it is possible to apply the present invention to any rotation measuring instrument capable of measuring the rotation angle and rotation speed of a rotating machine (motor, etc.) and not limited to the resolver. Further, explanation is given by taking a motor as an example of the rotating machine.

The angle detection device including a resolver is used for servo control of a motor and is required to have high reliability as well as being capable of detection with high accuracy. An angle detection device having redundancy, in which dual detection is implemented by providing two resolvers configured to detect the rotation of the same motor has been proposed in order to improve reliability. In order to further improve reliability, it can also be considered to provide three or more resolvers configured to detect the rotation of the same motor and the present invention can also be applied to such a case; however, in the following explanation, an example in which two resolvers are provided is explained.

In the angle detection device made redundant, each resolver is provided with an anomaly detection unit configured to monitor an internal signal and to detect the occurrence of an anomaly and whether each resolver is normal is detected. At this time, there is a case where signals of the two resolvers are further compared to find a difference to improve the detection accuracy of the occurrence of an anomaly. Normally, the angle detection device made redundant outputs a rotation angle and a rotation speed measured by one of the resolvers (first resolver). Then, when it is detected that an anomaly has occurred in the first resolver and if the other resolver (second resolver) is normal, switching is performed so that the rotation angle and rotation speed measured by the second resolver are output.

In the case where outputs of the two resolvers are switched, it is considered to simply change the output of the first resolver in which an anomaly has occurred to the output of the normal second resolver. However, during the period from the occurrence of an anomaly in the resolver until the anomaly is detected, the difference between the output of the resolver in which the anomaly has occurred and the output of the normal resolver increases. Because of this, if the output of the first resolver is switched simply to the output of the second resolver, the change in the output of the angle detection device becomes large and there arises a case where a malfunction of the motor control system, such as step-out of the motor, may occur.

RELATED DOCUMENTS

[Patent Document 1] Japanese Laid Open Patent Document No. H09-273942
[Patent Document 2] Japanese Laid Open Patent Document No. 2005-114442
[Patent Document 3] Japanese Laid Open Patent Document No. H09-068439
[Patent Document 4] Japanese Laid Open Patent Document No. 2009-150826
[Patent Document 5] Japanese Laid Open Patent Document No. 2006-058232
[Patent Document 6] Japanese Laid Open Patent Document No. 2009-210281
[Patent Document 7] Japanese Laid Open Patent Document No. 2002-243500
[Patent Document 8] Japanese Laid Open Patent Document No. 2005-003620

SUMMARY

According to a first aspect, an angle detection device includes: a first rotation measuring instrument configured to output a first angle signal and a first angular speed signal related to a rotation angle of a rotating body; a second rotation measuring instrument configured to output a second angle signal and a second angular speed signal related to the rotation angle of the rotating body; an anomaly detection unit configured to monitor signals in the first and second rotation measuring instruments and to detect occurrence of an anomaly in the first rotation measuring instrument and occurrence of an anomaly in the second rotation measuring instrument; and a switching interpolation unit configured to select one of a first set including the first angle signal and the first angular speed signal and a second set including the second angle signal and the second angular speed signal and output the selected one of the first set and the second set as a third angle signal and a third angular speed signal, the switching interpolation circuit being configured to select and output the first angle signal and the first angular speed signal as the third angle signal and the third angular speed signal when the first rotation measuring instrument is normal, the switching interpolation circuit being configured, when the second rotation measuring instrument is normal and an anomaly has occurred in the first rotation measuring instrument, to perform switching so that the second angle signal and the second angular speed signal are output as the third angle signal and the third angular speed signal and to perform interpolation so that the difference between the first angle signal and the second angle signal is reduced stepwise.

According to a second aspect, an angle detection method includes: detecting, by a first rotation measuring instrument, a rotation angle of a rotating body and generating a first angle signal and a first angular speed signal; detecting, by a second rotation measuring instrument, the rotation angle of the rotating body and generating a second angle signal and a second angular speed signal; monitoring signals in the first and second rotation measuring instruments and detecting occurrence of an anomaly in the first rotation measuring instrument and occurrence of an anomaly in the second rotation measuring instrument; outputting the first angle signal and the first angular speed signal as a third angle signal and a third angular speed signal when the first rotation measuring instrument is normal; and when the second rotation measuring instrument is normal and an anomaly has occurred in the first rotation measuring instrument, performing switching so that the second angle signal and the second angular speed signal are output as the third angle signal and the third angular speed signal and performing interpolation so that the difference between the first angle signal and the second angle signal is reduced stepwise.

The object and advantages of the embodiments will be realized and attained by means of the elements and combination particularly pointed out in the claims.

It is to be understood that both the foregoing general description and the following detailed description are exemplary and explanatory and are not restrictive of the invention.

BRIEF DESCRIPTION OF THE DRAWINGS

FIG. 6A to FIG. 6D are diagrams explaining switching by the selector illustrated in FIG. 1 and FIG. 2 and switching by the switching interpolation unit of the embodiment;

FIG. 15 and FIG. 16 are a flowchart illustrating a control flow of the control determination unit in FIG. 12.

DESCRIPTION OF EMBODIMENTS

Before describing embodiments, common examples of the angle detection device made redundant by having two resolvers and the motor control system mounting the angle detection device will be explained.

Figure 1:
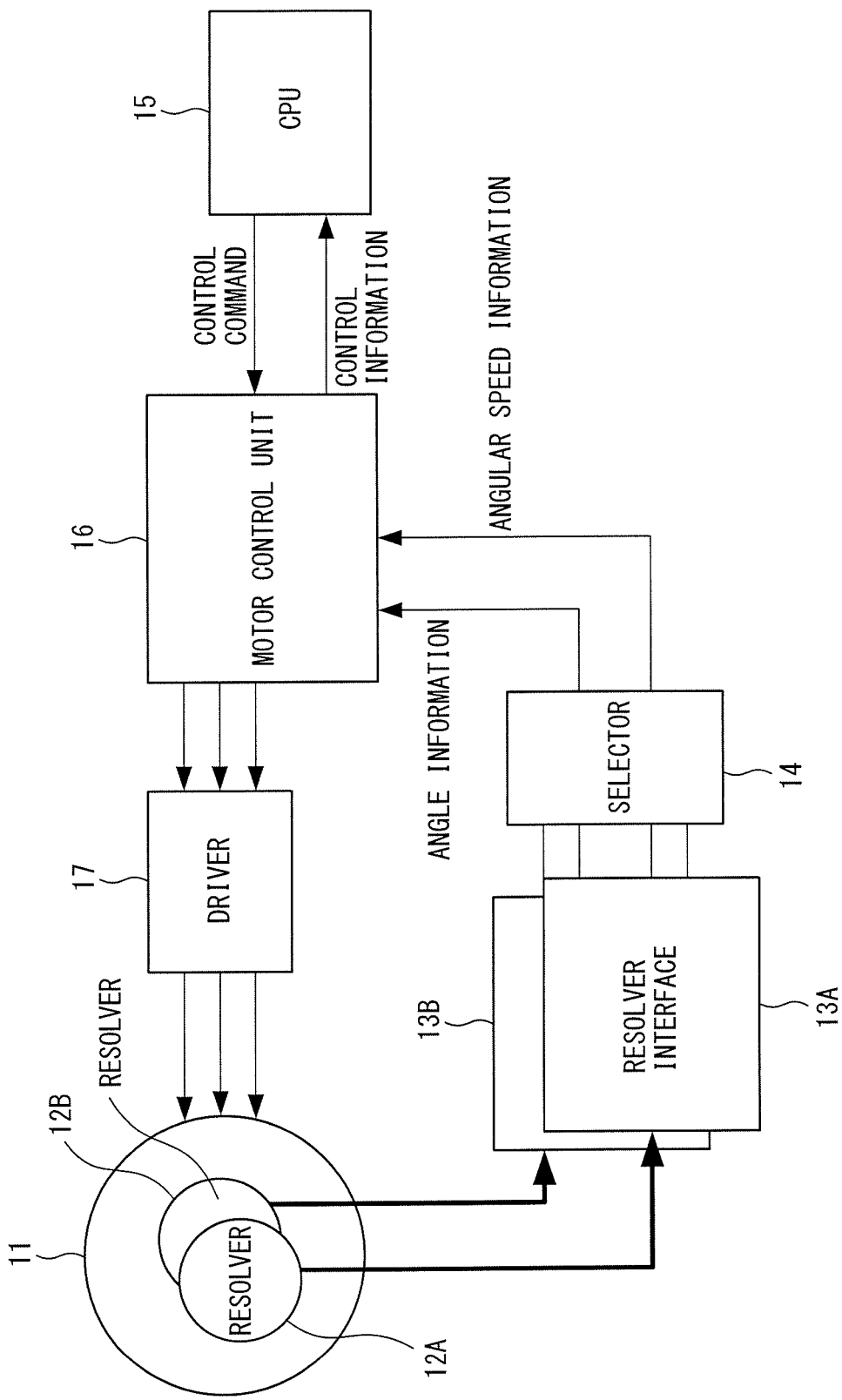
FIG. 1 is a diagram illustrating a configuration example of a motor control system mounting an angle detection device made redundant by having two resolvers.

FIG. 1 is a diagram illustrating a configuration example of a motor control system mounting an angle detection device made redundant by having two resolvers.

The motor control system has a motor 11, a first resolver 12A, a second resolver 12B, a first resolver interface 13A, a second resolver interface 13B, a selector 14, a CPU 15, a motor control unit 16, and a driver 17. The first resolver 12A, the second resolver 12B, the first resolver interface 13A, the second resolver interface 13B, and the selector 14 form the angle detection device. The combination of the first resolver 12A and the first resolver interface 13A is sometimes referred to as a first rotation measuring instrument and the combination of the second resolver 12B and the second resolver interface 13B is sometimes referred to as a second rotation measuring instrument.

The CPU 15 receives an operation request from outside, receives control information from the motor control unit 16, generates a control command based on these, and outputs the control command to the motor control unit 16. The motor control unit 16 is, for example, a motor control circuit and generates a motor control signal based on the control command from the CPU 15 and angle information and angular speed information from the selector 14 and outputs the motor control signal to the driver 17. The driver 17 is, for example, a driver circuit and generates a drive signal based on the motor control signal and applies the drive signal to the motor 11. In response to this, the motor 11 makes desired rotations.

The first resolver 12A and the second resolver 12B are arranged so that the rotors share the rotor and the shaft of the motor 11 and issue a sine wave signal and a cosine wave signal related to the rotation position. The first resolver interface 13A and the second resolver interface 13B are, for example, resolver interface circuits and perform an arithmetic operation to find and output the rotation angle and rotation speed (angular speed) of the motor 11 from the sine wave signal and the cosine wave signal output from the first resolver 12A and the second resolver 12B. A sensor that issues a sine wave signal and a cosine wave signal related to the rotation position is known other than the resolver and such a sensor may be used in place of the resolver.

As described above, the first and second resolvers 12A and 12B are arranged in the same motor 11 and when normal, the first and second resolver interfaces 13A and 13B output the same rotation angle and angular speed. Consequently, the selector 14 normally selects the first rotation angle and the first angular speed output from the first resolver interface 13A and outputs them to the motor control unit 16. If an anomaly occurs in the first rotation measuring instrument including the first resolver 12A and the first resolver interface 13A, the selector 14 performs switching so as to select the second rotation angle and the second angular speed output from the second resolver interface 13B. In this case, if an anomaly has occurred in the second rotation measuring instrument including the second resolver 12B and the second resolver interface 13B, switching is not performed and the angle detection device notifies the CPU 15 or the motor control unit 16 of the occurrence of an anomaly. This is the same also in the case where an anomaly has occurred in the second rotation measuring instrument after the selector 14 performs switching so as to select the second rotation angle and the second angular speed. In the following explanation, an example is explained in which an anomaly of the resolver is detected; however, the explanation also applies to the case where an anomaly of the rotation measuring instrument including the resolver interface is detected.

Figure 2:
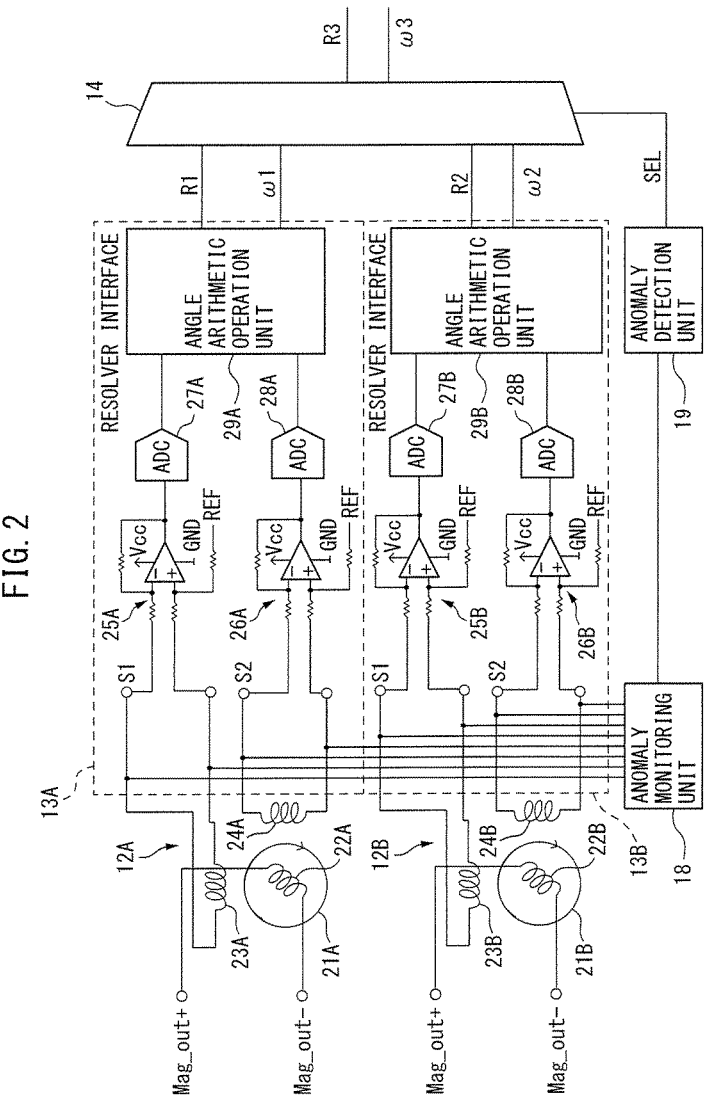
FIG. 2 is a diagram illustrating a detailed configuration of the angle detection device illustrated in FIG. 1.

FIG. 2 is a diagram illustrating a detailed configuration of the angle detection device including the first resolver 12A, the second resolver 12B, the first resolver interface 13A, the second resolver interface 13B, and the selector 14A in FIG. 1.

The first resolver 12A has a rotor 21A, an exciting coil 22A, a first detection coil 23A, and a second detection coil 24A. The amplitude of the reference signal from the sine wave oscillator is modulated in accordance with the rotation angle of the rotor 21A and the reference signal is applied to the exciting coil 22A, and a sine wave signal and a cosine wave signal in accordance with the rotation angles of the first detection coil 23A and the second detection coil 24A are induced. The sine wave signal induced on both ends of the first detection coil 23A is amplified by an amplification circuit 25A of the first resolver interface 13A, and then, is converted into a digital signal in an ADC 27A and supplied to an angle arithmetic operation circuit 29A. Similarly, the cosine wave signal induced on both ends of the second detection coil 24A is amplified by an amplification circuit 26A of the first resolver interface 13A, and then, is converted into digital data in an ADC 28A and supplied to the angle arithmetic operation circuit 29A. The angle arithmetic operation circuit 29A performs an arithmetic operation to find a first rotation angle R1 and a first angular speed ω1 of the rotor 21A from the data output from the ADC 27A and the ADC 28A and outputs them. The second resolver 12B and the second resolver interface 13B are the same as those described above, and therefore, explanation is omitted. Further, the resolver and the resolver interface are described in enumerated Patent Literatures, etc., and widely known, and therefore, more explanation is omitted.

An anomaly monitoring unit 18 monitors analog signals output from the first detection coil 23A, the second detection coil 24A, a first detection coil 23B, and a second detection coil 24B and monitors whether or not the first resolver 12A and the second resolver 12B are normal, i.e., whether an anomaly has occurred. An anomaly detection unit 19 detects whether or not the first resolver 12A is normal (whether anomalous) and whether or not the second resolver 12B is normal (whether anomalous) from monitoring signals of the anomaly monitoring unit 18. The occurrence of an anomaly in the resolver is detected by monitoring the signal of only each resolver by the method described in Patent Literature 7. At this time, the output of the angle arithmetic operation circuit is utilized in accordance with the necessity. Further, by comparing the signal from the first resolver 12A and the signal from the second resolver 12B, it is possible to detect the occurrence of an anomaly with higher accuracy. Although the detection method of the occurrence of an anomaly is not limited here in particular, the detection of the occurrence of an anomaly in a general resolver needs a certain period of time. Further, there is a case where an anomaly occurs in the resolver interface, and therefore, it may also be possible to perform monitoring of an anomaly including the first and second resolver interfaces 13A and 13B. In other words, it may also be possible to detect the occurrence of an anomaly by each of the first rotation measuring instrument and the second rotation measuring instrument.

In the case where both the first rotation measuring instrument and the second rotation measuring instrument are normal, the anomaly detection unit 19 outputs, for example, a selection signal SEL to select the first detection signal to the selector 14. In response to this, the selector 14 selects the first rotation angle R1 and the first angular speed ω1 and outputs as a third rotation angle R3 and a third angular speed ω3.

In the case of detecting that an anomaly has occurred in the first rotation measuring instrument, the anomaly detection unit 19 outputs the selection signal SEL to perform switching so that a second detection signal including a second rotation angle R2 and a second angular speed ω2 output from the second rotation measuring instrument is selected to the selector 14. In response to this, the selector 14 selects the second rotation angle R2 and the second angular speed ω2 and outputs as the third rotation angle R3 and the third angular speed ω3. However, in the case where an anomaly has already occurred also in the second rotation measuring instrument when an anomaly occurs in the first rotation measuring instrument, the anomaly detection unit 19 outputs the selection signal SEL to detect neither the first detection signal nor the second detection signal to the selector 14 and outputs a signal to notify the occurrence of an anomaly. This is the same also in the case where an anomaly occurs in the second rotation measuring instrument after the selection signal SEL to perform switching so that the second detection signal is selected is output.

Figure 3:
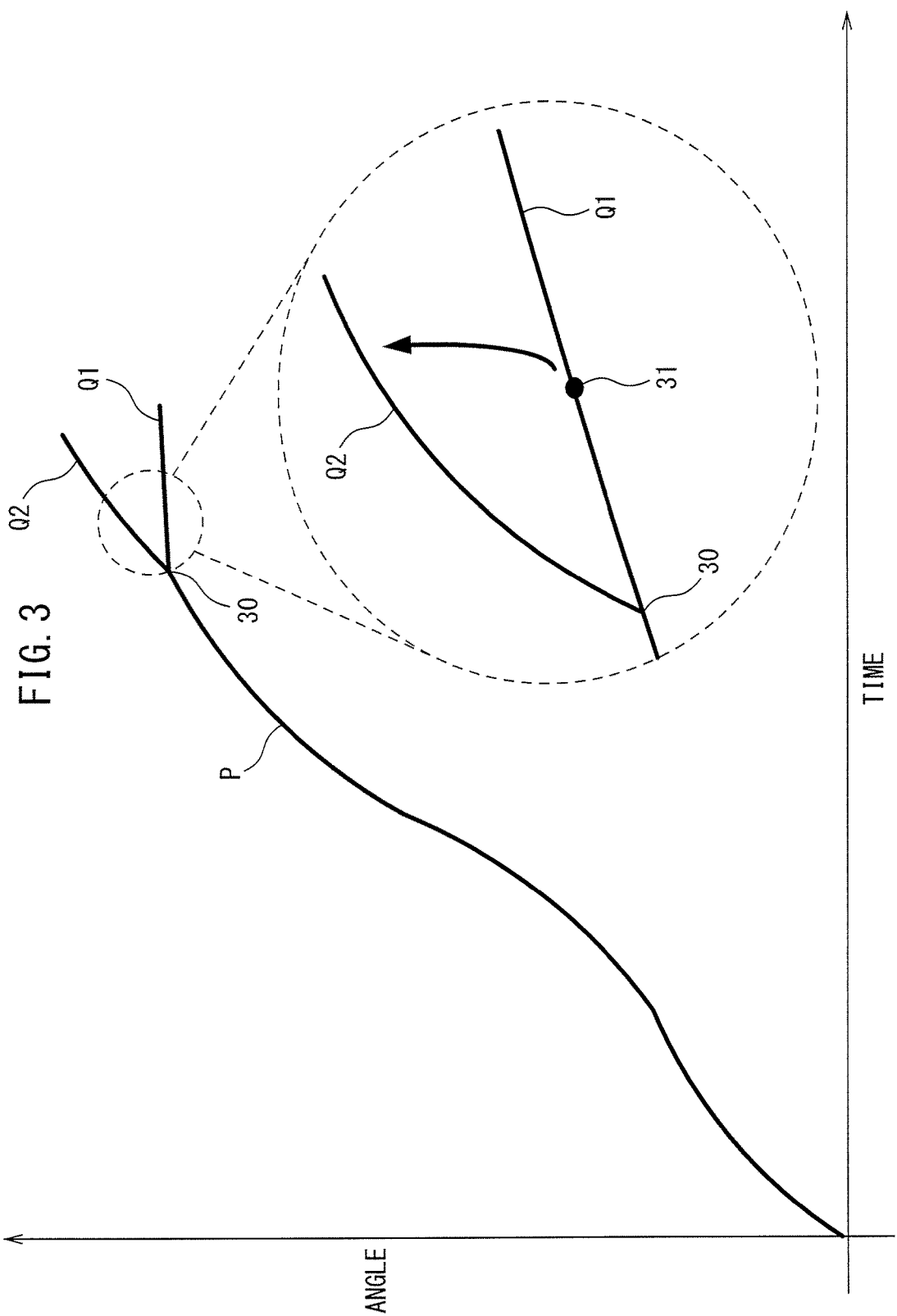
FIG. 3 is a diagram illustrating a change in the first rotation angle and the second rotation angle at the time of switching in the angle detection device in FIG. 2.

FIG. 3 is a diagram illustrating a change in the first rotation angle R1 and the second rotation angle R2 at the time of switching in the angle detection device in FIG. 2.

In FIG. 3, P indicates the change in the first rotation angle R1 and the second rotation angle R2 in the case where the first rotation measuring instrument and the second rotation measuring instrument are normal. Because the first rotation measuring instrument and the second rotation measuring instrument are normal, the first rotation angle R1 and the second rotation angle R2 indicate the same value.

A case in which an anomaly occurs in the first rotation measuring instrument at a time indicated by a reference numeral 30 in FIG. 3 is considered. Because the second rotation measuring instrument is normal, the second rotation angle R2 changes as indicated by Q2 in accordance with the rotation of the motor. On the other hand, because the first rotation measuring instrument is anomalous, the value of the first rotation angle R1 changes as indicated by Q1 and the difference from the second rotation angle R2 increases as time elapses.

As described previously, in the detection of the occurrence of an anomaly in the resolver (rotation measuring instrument), a certain period of time needs to elapse from occurrence to detection. As illustrated in FIG. 3, if it is assumed that the occurrence of an anomaly in the first rotation measuring instrument is detected at a time indicated by reference numeral 31, the difference between Q1 and Q2 has increased. Because of this, if the data that the selector 14 outputs as R3 and ω3 is switched from the set of R1 and ω1 to the set of R2 and ω2, there occurs a case where R3 and ω3 change considerably.

R3 and ω3 that the selector 14 outputs are used for servo control in the motor control unit 16 and if a large change occurs, the servo control is adversely affected and in the worst case, step-out etc. occurs. What is problematic in this case is the large change in the rotation angle R3.

Because of downsizing, the motor is required to rotate faster. Because of this, even if the detection time of the occurrence of an anomaly in the rotation measuring instrument is the same, the difference between the first detection signal and the second detection signal becomes large in the meantime, and the influence on the servo control becomes larger.

Consequently, the angle detection device made redundant by having two resolvers is required to switch the rotation angle to that detected by the normal resolver without adversely affecting the servo control etc. in the subsequent stages in the case where an anomaly occurs in the resolver. In an embodiment explained below, an angle detection device made redundant by having two resolvers whose operation has been improved is disclosed.

Figure 4:
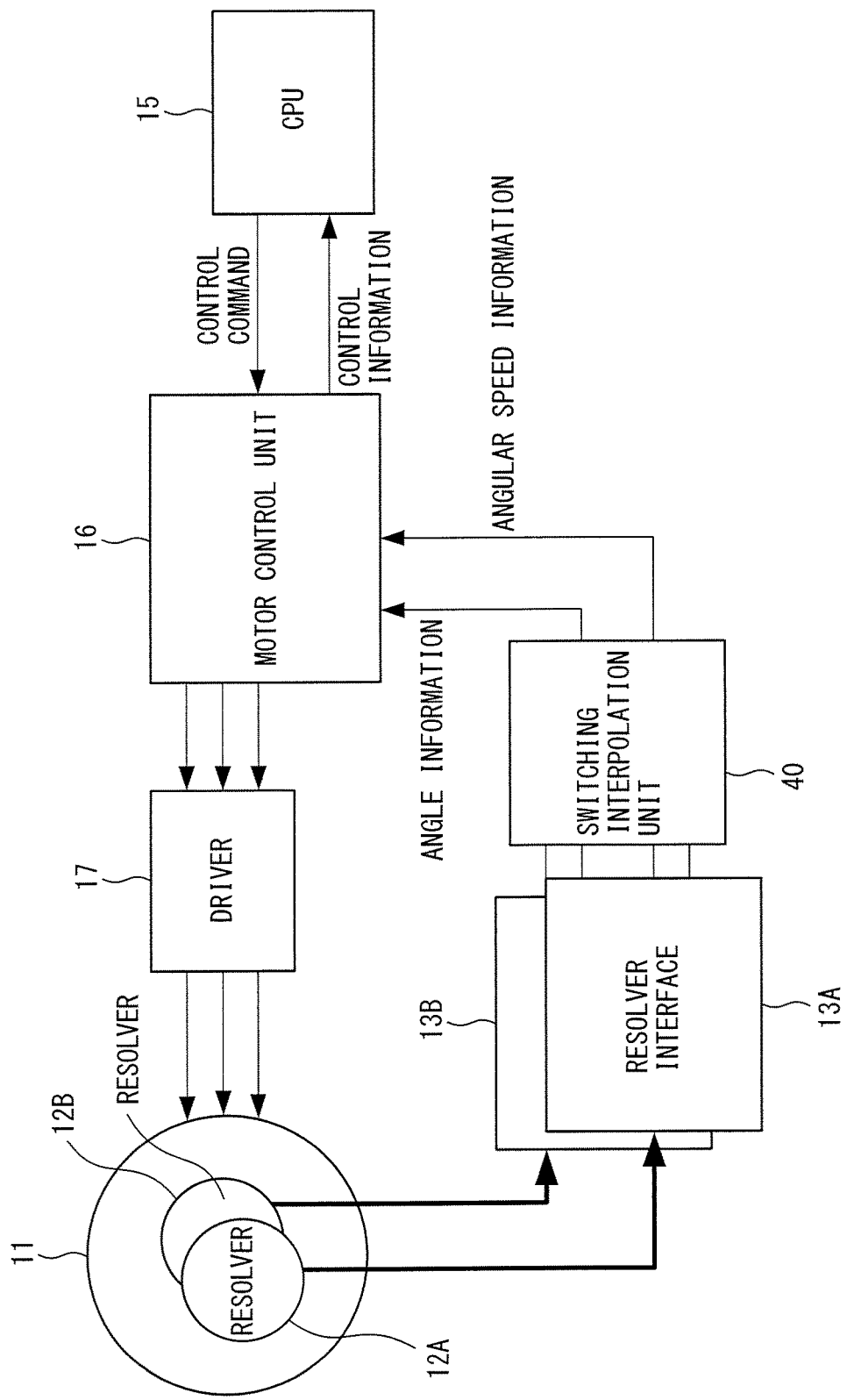
FIG. 4 is a diagram illustrating a configuration of a motor control system of the embodiment.

FIG. 4 is a diagram illustrating a configuration of a motor control system of the embodiment. The motor control system has the motor 11, the first resolver 12A, the second resolver 12B, the first resolver interface 13A, the second resolver interface 13B, the CPU 15, the motor control unit 16, the driver 17, and a switching interpolation unit 40. In other words, the motor control system of the embodiment is a system mounting an angle detection device made redundant by having two resolvers and different from the configuration in FIG. 1 in that the switching interpolation unit 40 is provided in place of the selector 14 and others are the same as those in the system in FIG. 1. Consequently, an explanation of portions other than the switching interpolation unit 40 is omitted.

Figure 5:
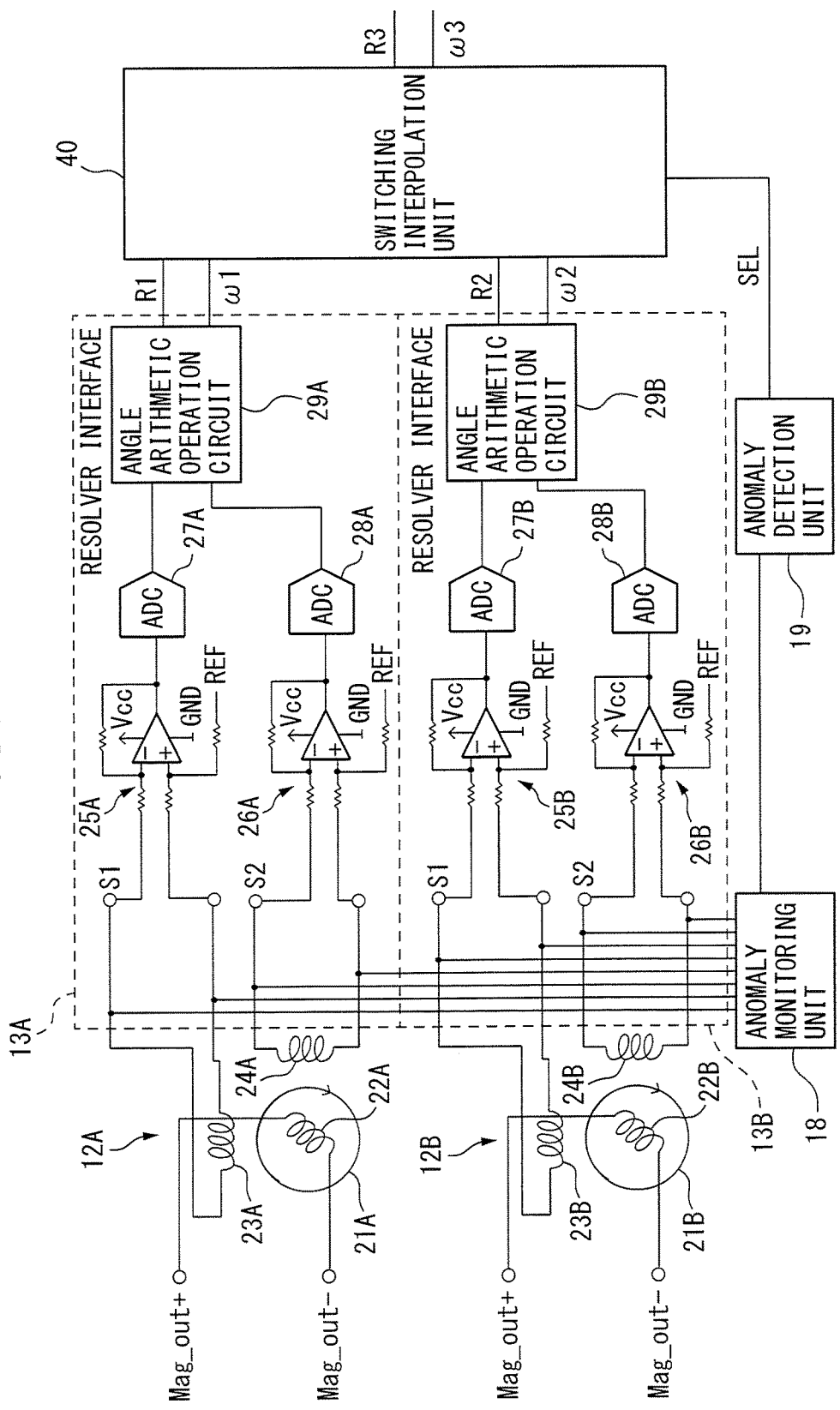
FIG. 5 is a diagram illustrating a detailed configuration of the angle detection device in the embodiment.

FIG. 5 is a diagram illustrating a detailed configuration of the angle detection device in the embodiment. The angle detection device of the embodiment has the first resolver 12A, the second resolver 12B, the first resolver interface 13A, the second resolver interface 13B, and the switching interpolation unit 40. In other words, the angle detection device of the embodiment differs from the configuration in FIG. 2 in that the switching interpolation unit 40 is provided in place of the selector 14 and others are the same as those of the angle detection device in FIG. 2. The portion including the first resolver 12A and the first resolver interface 13A and which outputs the first detection signal (the first rotation angle R1 and the first rotation angular speed ω1) is referred to as the first rotation measuring instrument. Similarly, the portion including the second resolver 12B and the second resolver interface 13B and which outputs the second detection signal (the second rotation angle R2 and the second rotation angular speed ω2) is referred to as the second rotation measuring instrument.

The switching interpolation unit 40 of the embodiment is, for example, a switching interpolation circuit and selects the first detection signal and outputs as the third rotation angle R3 and the third rotation angular speed ω3 if the first rotation measuring instrument and the second rotation measuring instrument are normal. In the case where an anomaly occurs in the first rotation measuring instrument, the switching interpolation unit 40 switches selections so that the second detection signal is selected and output as the third rotation angle R3 and the third rotation angular speed ω3 if the second rotation measuring instrument is normal. The above function is the same as that of the selector 14 in FIG. 1 and FIG. 2. Further, the switching interpolation unit 40 of the embodiment does not simply perform switching when switching the selection from the first detection signal to the second detection signal but performs switching while performing interpolation so that third rotation angle R3 stepwise reduces the difference from the second rotation angle R2.

FIG. 6A to FIG. 6D are diagrams explaining switching by the selector 14 illustrated in FIG. 1 and FIG. 2 and switching by the switching interpolation unit 40 of the embodiment.

In FIG. 6A to FIG. 6D, in order to simplify explanation, it is assumed that the first rotation angular speed ω1 and the second rotation angular speed ω2 when an anomaly has occurred in the first rotation measuring instrument are equal and constant afterward and the first rotation angle R1 and the second rotation angle R2 are different. Further, Q1 indicates the first rotation angle R1 and Q2 indicates the second rotation angle R2 and 0<ω1=ω2=constant holds, and therefore, Q1 and Q2 will be monotonically increasing lines parallel to each other.

FIG. 6A illustrates switching by the selector 14. The selector 14 only switches the first detection signal (the first rotation angle R1 and the first rotation angular speed ω1) to the second detection signal (the second rotation angle R2 and the second rotation angular speed ω2), and therefore, the change from the first rotation angle R1 to the second rotation angle R2 ends instantaneously. Consequently, the change in the rotation angular speed in this case is very large.

In the motor control system, if the change in the rotation angle as described above occurs, the angle of the control target changes considerably as a result and control to considerably change the rotation angular speed is performed so that the target angle is achieved. In response to this, the driver 17 abruptly changes the drive signal, and therefore, an adverse influence, such as step-out, will occur. Further, in accordance with the drive signal, the rotation speed of the motor 11 changes abruptly and approaches the target rotation speed, but this time, the rotation speed abruptly reduces conversely and the changes beyond the target rotation speed because of inertia, and therefore, the rotation speed converges to the target rotation speed by repeating such control. In other words, the rotation speed converges to the target rotation speed while oscillating. As described above, the instantaneous switching by the selector 14 illustrated in FIG. 1 and FIG. 2 adversely affects the subsequent stages that utilize the detection signal.

FIG. 6B illustrates the case where interpolation processing to change the original rotation angle Q1 to the target rotation angle Q2 by a maximum allowable angular speed Δω of the servo control system is performed. The angular speed for the original rotation angle Q1 is increased by Δω. In this case, the influence on the motor control system is the minimum, but the switching time becomes longer.

For example, when the driver 17 drives the motor 11 by PWM, an amount of control (Ang_L) specified within one period of the PWM carrier frequency is defined as follows from a PWM carrier frequency (fc) and a motor rotation speed (R [rps]).

$$Ang\_L < 360 \times R/fc [°]$$

The angular speed at the time of rotational operation by the amount of change of Ang_L is taken to be ωMAX. This angular speed ωMAX is the maximum amount of change that can be implemented by the PWM drive.

FIG. 6C illustrates the case where the change from the original rotation angle Q1 to the target rotation angle Q2 is changed by the angular speed ωMAX. In this case, an accelerating angular speed Δω is added to the angular speed for the original rotation angle Q1 and the resultant sum is taken to be ωMAX.

If switching is performed by ωMAX, it is possible to complete switching in a short time, but if ωMAX is set abruptly, the motor control system is adversely affected as in the case in FIG. 6A.

FIG. 6D illustrates interpolation processing in the switching interpolation unit 40 of the motor control system of the embodiment. In this interpolation processing, the change from the original rotation angle Q1 to the target rotation angle Q2 is made by changing the angular speed stepwise. In FIG. 6D, the angular speed for the original rotation angle Q1 is slightly accelerated for each unit processing time and then the interpolation rotation angle is calculated and the angular speed is further accelerated slightly and then the interpolation rotation angle is calculated, and this processing is repeated. Then, when the angular speed increases and reaches the ωMAX described above, the interpolation rotation angle is calculated for each unit processing time while maintaining the acceleration by the ωMAX. When the interpolation rotation angle approaches the rotation angle Q2, the angular speed is reduced from the ωMAX and when the interpolation rotation angle agrees with the rotation angle Q2, switching is performed completely to the output of the second rotation measuring instrument.

Figure 7:
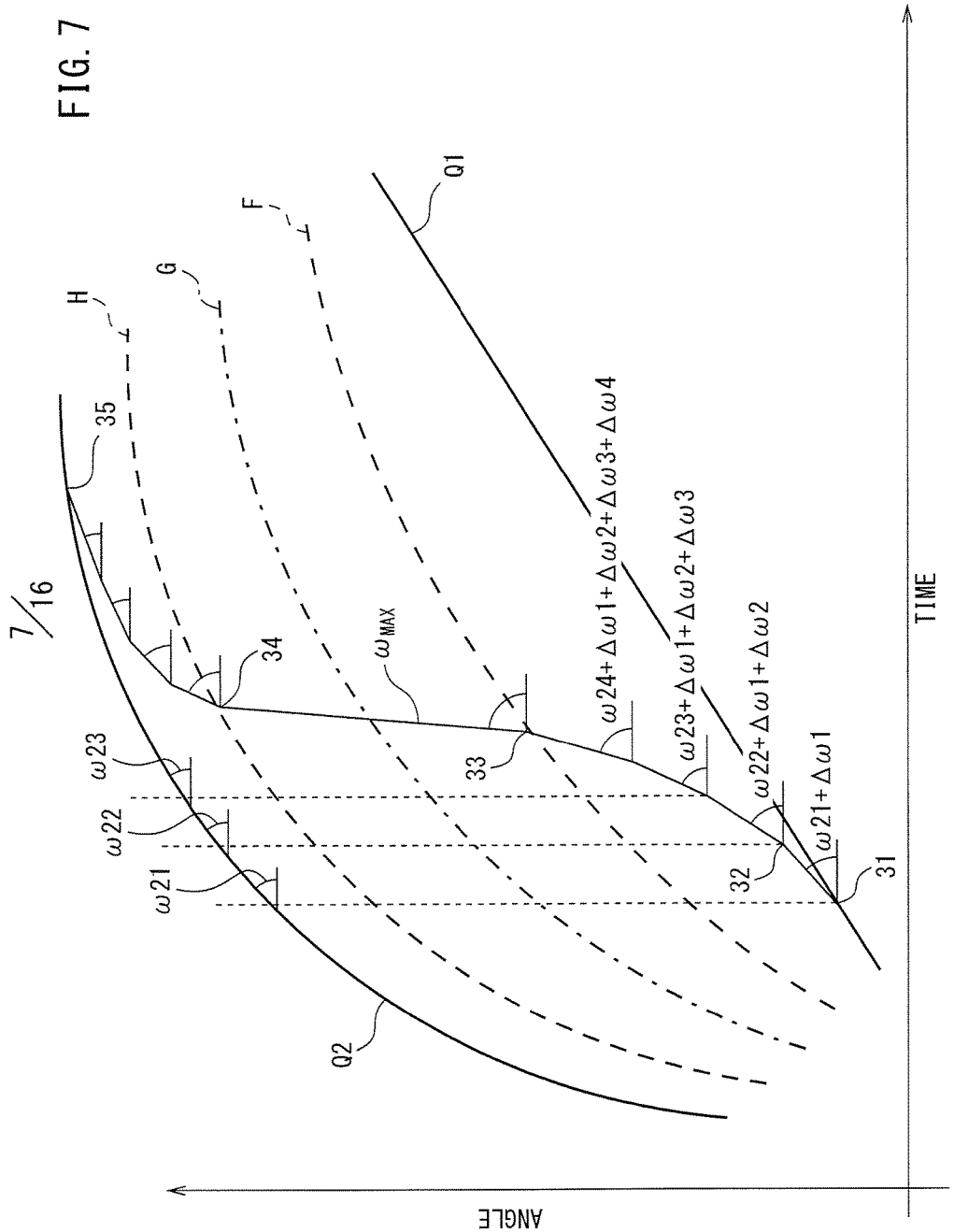
FIG. 7 is a diagram more specifically explaining the switching interpolation processing by the switching interpolation unit of the embodiment.

FIG. 7 is a diagram more specifically explaining the switching interpolation processing by the switching interpolation unit 40 of the embodiment. In the example illustrated in FIG. 6D, explanation is given on the assumption that the second rotation angular speed ω2 when an anomaly occurs in the first rotation measuring instrument is constant and does not change afterward, however, in actuality, the second rotation angular speed ω2 changes in accordance with the rotation of the motor 11. In FIG. 7, Q1 indicates the change in the first rotation angle R1 and at the time indicated by reference numeral 31, the occurrence of an anomaly is detected and switching to the second detection signal (the second rotation angle R2 and the second rotation angular speed ω2) is started. In FIG. 7, Q1 indicates that the angular speed is constant; however, no matter how the angular speed changes after the time indicated by reference number 31, the processing is not affected. Q2 indicates a curve of the change in the second rotation angle R2 and at the time indicated by reference numeral 31, the angle is already different from that of Q1 and the angular speed is also already different and will continue to change afterward.

FIG. 7 illustrates the case where the second rotation angle R2 is larger than the first rotation angle R1 at the time of start of switching and R1 is increased gradually until R1 agrees with R2 and then switching to R2 is performed. The third angular speed ω3 is switched from ω1 to ω2 at the time indicated by reference numeral 31 and the angular speed in the following explanation relates only to interpolation processing to perform an arithmetic operation to find the rotation angle R3.

In FIG. 7, F indicates a curve of the change in the acceleration boundary angle difference, G indicates a curve of the change in the foldback angle, and H indicates a curve of the change in the deceleration boundary angle difference. The curve F of the change in the acceleration boundary angle difference indicates the point of time when the angular speed is increased stepwise up to the maximum angular speed ωMAX in the case where the first rotation angle R1 is changed to the second rotation angle R2 in the switching interpolation processing. The curve G of the change in the foldback angle indicates the point of time, which is the middle of the range where acceleration is performed with the maximum angular speed ωMAX so that the second rotation angle R2 is approached from the state on the curve F of the change in the acceleration boundary angle difference. The curve H of the change in the deceleration boundary angle difference indicates the point of time when deceleration is started so that the second rotation angular speed ω2 is approached from the maximum angular speed ωMAX because the second rotation angle R2 is approached. How much the angular speed is increased or decreased in order to interpolate the rotation angle is determined in accordance with the second rotation angular speed ω2 at that point of time.

Figure 8:
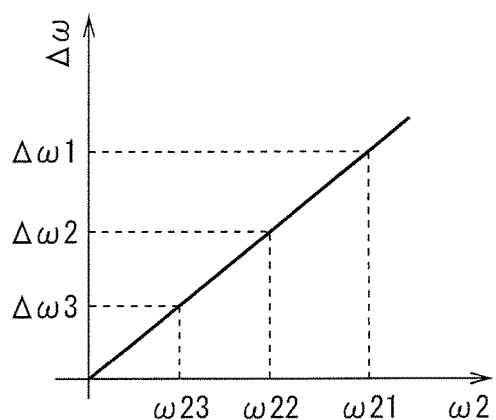
FIG. 8 is a diagram illustrating how much the angular speed is increased or decreased is set for the second rotation angular speed in the rotation angle interpolation processing.

FIG. 8 is a diagram illustrating how much the angular speed is increased or decreased is set for the second rotation angular speed ω2 in the rotation angle interpolation processing. As illustrated in FIG. 8, the amount by which the angular speed is increased or decreased is determined so as to be proportional to the second rotation angular speed ω2.

Next, how interpolation processing is performed on the rotation angle R3 is explained in detail using the example in FIG. 7.

The interpolation processing is started at the time (t1) indicated by reference numeral 31. The first rotation angle at t1 is R1 and this will become the interpolated third rotation angle R31 at the time of start of switching. At t1, the second rotation angle R2 is ahead of (on the plus side of) the first rotation angle R1, and therefore, it is necessary to perform an arithmetic operation to find R3 by accelerating the second rotation angular speed ω21 at that point of time (if not accelerated, R2 is not caught up with). According to FIG. 8, ω21 is increased by Δω1, and therefore, the rotation angular speed ω31 for the interpolation processing to perform an arithmetic operation to find R3 at the time of start of switching processing will be ω21+Δω1.

When one unit control period elapses and a time (t2) indicated by reference numeral 32 is reached, the third rotation angle R32 is R31+(ω21+Δω1) (t2−t1). At t2, the second rotation angular speed ω2 is ω22 and according to FIG. 8, ω22 is further increased by Δω2, and therefore, the rotation angular speed ω32 for the interpolation processing will be ω22+Δω1+Δω2.

In FIG. 7, by repeating the processing four times, the third rotation angle R3 increases and at a point of time indicated by reference numeral 33, the curve F of the change in the acceleration boundary angle difference is reached. The rotation angular speed ω34 to increase R3 at this point of time is ω24+Δω1+Δω2+Δω3+Δω4. Next, an arithmetic operation is performed on the assumption that the third rotation angle R3 is accelerated by the maximum angular speed ωMAX and a value found by the arithmetic operation is output for each unit control period. This state is maintained until the third rotation angle R3 reaches the curve H of the change in the deceleration boundary angle difference.

When the third rotation angle R3 reaches the curve H of the change in the deceleration boundary angle difference at time indicated by reference numeral 34, deceleration of the rotation angular speed for interpolation processing from the maximum angular speed ωMAX is started. The interpolation processing of deceleration is similar to the interpolation processing of acceleration and acceleration to reduce the speed is determined from the values of the rotation angular speed and the second rotation angular speed ω2 at that point of time.

By repeating the above processing, the third rotation angle R3 approaches the second rotation angle R2 and at a time indicated by reference numeral 35, the third rotation angle R3 agrees with the second rotation angle R2. After that, the second rotation angle R2 is output as the third rotation angle R3.

As a summary of the above, the switching interpolation unit 40 of the embodiment performs the switching interpolation processing by the procedure below.

(1) An angle difference between resolvers is found.
(2) From the angular speed ω of the switching destination, Δω is found.
(3) A calculated angular speed during switching for interpolation processing is found from the positive/negative state of the angle difference, Δω, and ω.

(4) When the calculated angular speed during switching reaches the limit value of the upper limit or the lower limit, the calculated angular speed is switched to the limit value.

(5) When the target angle is approached, an arithmetic operation in the direction opposite to that in (3) described above is performed and a calculated angular speed during switching is found.

(6) A calculated angle is found by integrating the calculated angular speed during switching.

(7) In the manner as described above, the calculated angle becomes closer to the resolver angle of the switching destination.

Figure 9:
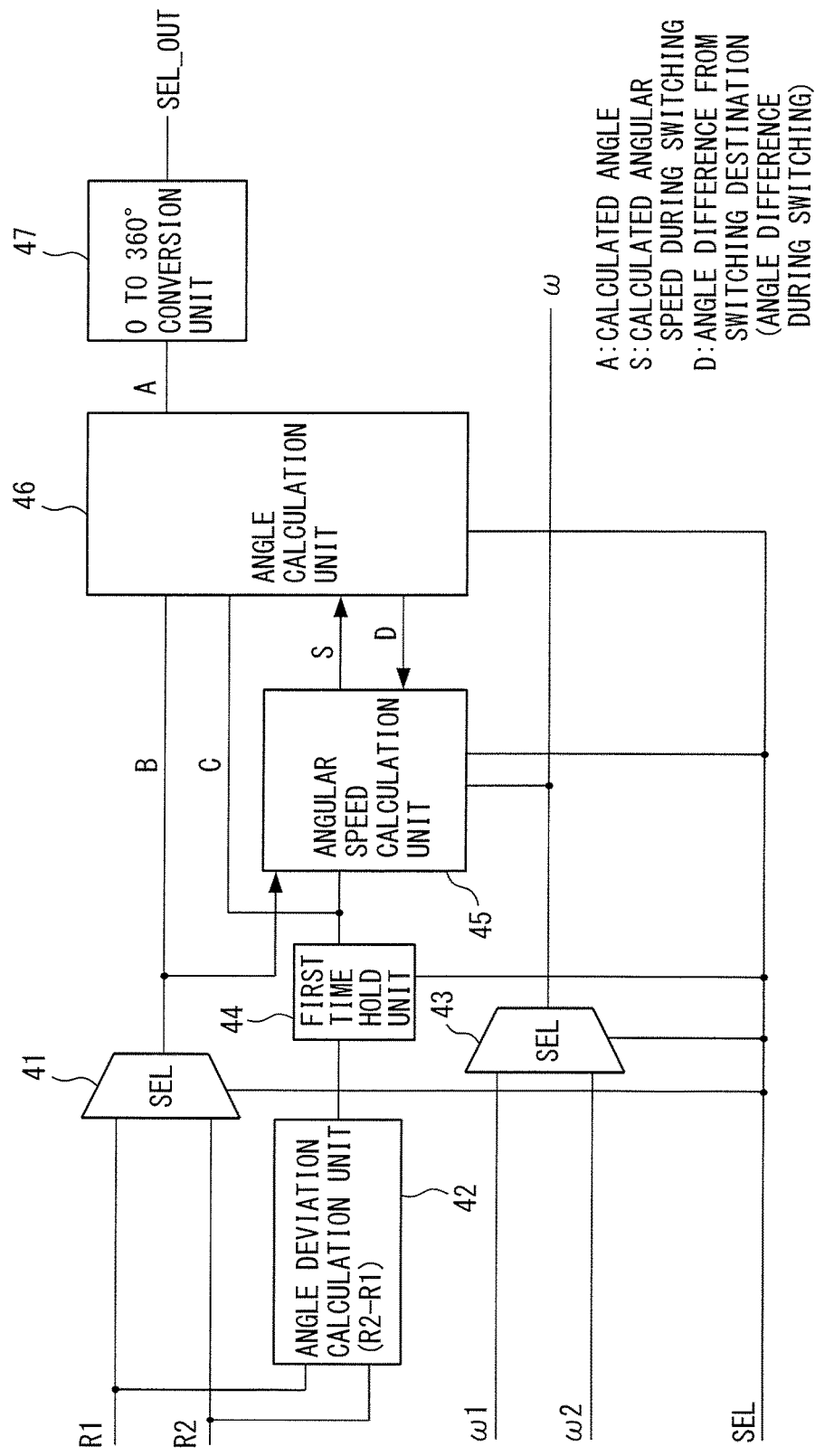
FIG. 9 is a circuit configuration block diagram of the switching interpolation unit.

FIG. 9 is a circuit configuration block diagram of the switching interpolation unit 40 that performs the operations described above.

The switching interpolation unit 40 has a selector 41, an angle deviation calculation unit (R1−R2) 42, a selector 43, a first time hold unit 44, an angular speed calculation unit 45, an angle calculation unit 46, and a 0 to 360° conversion unit 47.

The selector 41 selects one of the first rotation angle R1 from the first rotation measuring instrument and the second rotation angle R2 from the second rotation measuring instrument in accordance with the selection signal SEL and outputs as an angle B. The selection signal SEL is a signal by which the selector 41 selects R1 when the first rotation measuring instrument is normal and selects R2 when it is detected that the first rotation measuring instrument is anomalous.

The angle deviation calculation unit (R1−R2) 42 always performs an arithmetic operation to find the difference between R1 and R2 in preparation for the occurrence of an anomaly.

The selector 43 selects one of the first rotation angular speed ω1 from the first rotation measuring instrument and the second rotation angular speed ω2 from the second rotation measuring instrument and outputs as the switching destination angle B.

The first time hold unit 44 saves the angle difference R1−R2 output from the angle deviation calculation unit (R1−R2) and outputs as an angle difference C immediately after switching when an anomaly is detected in the first rotation measuring instrument and the selection signal SEL is switched.

The angular speed calculation unit 45 receives the angle difference C and the switching destination angle B (the second rotation angle R2 during switching processing) output from the selector 41 and generates a calculated angular speed S during switching. The angular speed calculation unit 45 reduces the switching time by performing interpolation processing of the angle difference between R1 and R2 by dividing the interpolation processing for each state of progress thereof so as to avoid influence on the motor control system. Further, even in the case where the angular speed changes during switching, the angular speed calculation unit 45 follows the change and continues to calculate the angular speed by checking the angular speed ω of the switching destination for each control period.

The angle calculation unit 46 receives the angle difference C, the second rotation angle R2 output from the selector 41, and the calculated angular speed S during switching output from the angular speed calculation unit 45 and generates a calculated rotation angle A that changes stepwise. The interpolation rotation angle is generated by performing interpolation processing so as to reduce the switching time and at the same time, to change stepwise with an angle difference that does not affect the motor control system.

Further, even in the case where the angular speed changes during switching, the angle calculation unit 46 follows the change and continues to calculate the angular speed by checking the angular speed cot output from the second rotation measuring instrument, which is the switching destination, for each unit control period. Furthermore, the angle calculation unit 46 always compares the rotation angle R2 output from the second rotation measuring instrument, which is the switching destination, and the angular speed S calculated from the angular speed generated by the angular speed calculation unit 45 and finds a difference therebetween, and then provides the difference to the angular speed calculation unit 45 as an angle difference (angle difference during switching) D from the switching destination.

In the case where the rotation angle value A found by the angle calculation unit 46 is negative or exceeds 360°, the 0 to 360° conversion unit 47 corrects the rotation angle value A to a value between 0° and 360°.

The change in the calculated angular speed in the switching interpolation processing described above and terms used are explained.

Figure 10:
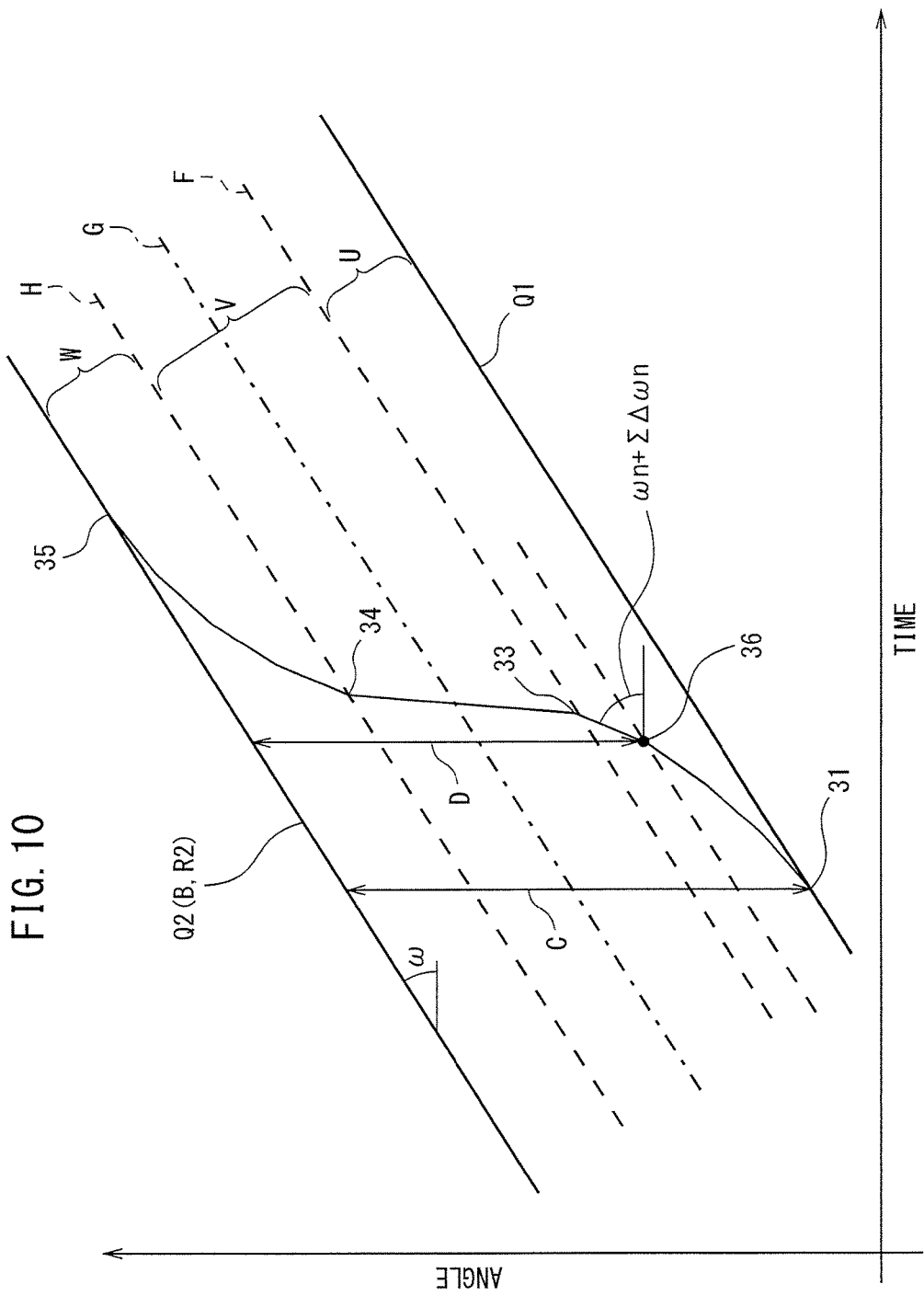
FIG. 10 is a diagram explaining the change in the calculated angular speed in the interpolation processing and terms used in the interpolation processing.

FIG. 10 is a diagram explaining the change in the calculated angular speed in the interpolation processing and terms used in the interpolation processing. FIG. 10 corresponds to the drawing used in FIG. 6D and for the sake of simplification of explanation, the change in the second rotation angle R2 of the second rotation measuring instrument, which is the switching destination, and the change in the first rotation angle R1 of the first rotation measuring instrument, from which switching is performed, are indicated by straight lines, but as described previously, the changes are indicated actually by curves that vary at all times.

Foldback Angle

The foldback angle is an angle different from the angle B (R2) of the switching destination by ½ of the angle difference C at the time of switching. Because B (R2) varies, correction is made at all times by an expression below.

$$\text{Foldback angle} = B + C/2 \; (C \text{ is negative when } R1 < R2 \text{ and positive when } R1 > R2)$$

Acceleration Boundary Angle Difference

The acceleration boundary angle difference is taken to be the angle difference when the angular speed S during switching reaches ωMAX in the case where the correction direction of the angle difference C at the time of switching is the forward direction (R1<R2). For example, the example illustrated in FIG. 7 is an example when ωMAX is reached in the fourth time unit control period.

The acceleration boundary angle difference is located on the opposite side of the deceleration boundary angle difference, whose details will be described later, in the case where the correction direction of the angle difference C at the time of switching is the backward direction (R1>R2). However, in view of a possibility that there is a difference in speed difference, correction terms as follows are attached.

(Case 1) In the case where the correction direction of the angle difference C at the time of switching is the forward direction (R1<R2)

If $\omega MAX = \omega 4 + \Delta\omega 1 + \Delta\omega 2 + \Delta\omega 3 + \Delta\omega 4$ is supposed, the acceleration boundary angle difference=$(\omega 1 + \Delta\omega 1)\,t1 + (\omega 2 + \Delta\omega 1 + \Delta\omega 2)\,t2 + (\omega 3 + \Delta\omega 1 + \Delta\omega 2 + \Delta\omega 3)\,t3 + (\omega 4 + \Delta\omega 1 + \Delta\omega 2 + \Delta\omega 3 + \Delta\omega 4)\,t4$.

(Case 2) In the case where the correction direction of the angle difference C at the time of switching is the backward direction (R1>R2)

$$\text{Acceleration boundary angle difference} = \omega/((\omega dm + \omega s)/2),$$

where

ωs: the second angular speed ω2 of the second rotation measuring instrument at the time of switching, and ωdm: the angular speed when the angle difference Dm during switching at the time of arrival at the boundary angle is reached.

Deceleration Boundary Angle Difference

In the case where the correction direction of the angle difference C at the time of switching is the forward direction, the deceleration boundary angle difference is located on the opposite side of the acceleration boundary angle difference. However, in view of a possibility that there is a difference in speed difference, correction terms as follows are attached.

The deceleration boundary angle difference is taken to be the angle difference when the angular speed S during switching reaches MIN in the case where the correction direction of the angle difference C at the time of switching is the backward direction.

(Case 1) In the case where the correction direction of the angle difference C at the time of switching is the forward direction (R1<R2)

Deceleration boundary angle difference=ω/((ωdm+ωs)/2), where

ωs: the second angular speed ω2 of the second rotation measuring instrument at the time of switching, and ωdm: the angular speed when the angle difference (Dm) during switching at the time of arrival at the boundary angle is reached.

(Case 2) In the case where the correction direction of the angle difference C at the time of switching is the backward direction (R1>R2)

If ωMAX=ω4−Δω1−Δω2−Δω3−Δω4 is supposed, the acceleration boundary angle difference=(ω1−Δω1) t1+(ω2−Δω1−Δω2) t2+(ω3−Δω1−Δω2−Δω3) t3+(ω4−Δω1−Δω2−Δω3−Δω4) t4.

Calculated Angle A

The calculated angle A refers to the rotation angle generated by the angle calculation unit 46 of the switching interpolation unit 40, corresponding to the angle indicated by the point of bend on the straight line that changes stepwise from Q1 to Q2 in FIG. 10.

Angular Speed S During Switching

The angular speed S during switching is the displacement by which to determine the interpolation angle represented as the angular speed.

The angular speed S during switching agrees with the angular speed ω2 of the second rotation measuring instrument of the switching destination at the time of start of switching and at the time of end of switching and indicated by such a curve that takes the maximum (minimum) angular speed in the vicinity of the foldback angle.

Angle Difference C at the Time of Switching

A difference between the rotation angle R1 of the first rotation measuring instrument, from which switching is started, and the rotation angle R2 of the second rotation measuring instrument of the switching destination at the time of start of switching. The angle difference C at the time of switching remains the same and is held until switching ends.

Angle difference D from the rotation angle R2 of the second rotation measuring instrument of the switching destination An angle difference compared with the rotation angle R2 of the second rotation measuring instrument of the switching destination. The angle difference D is the same value as the angle difference C at the time of switching at the time of start and becomes "0" when switching ends.

Angle difference Dm from the switching destination at the time of arrival at the boundary angle $Dm$=angle difference $C$ immediately after switching−angle difference $D$ from the switching destination Explanation of the fundamental principles of calculation of the calculated angle A during switching in the embodiment in association with FIG. 10 will be as follows.

From the point of time of the start of switching indicated by reference numeral 31 on Q1 until the calculated angle A reaches the acceleration boundary angle difference F, Q2 (R2) is ahead of Q1 (R1), and therefore, acceleration is performed gradually so as not to affect the servo control and the calculated angle A is calculated and output sequentially. When the calculated angle A reaches the acceleration boundary angle difference F, the calculated angular speed S has already reached the maximum angular speed and between the acceleration boundary angle difference F and the deceleration boundary angle difference H, the calculated angular speed S is fixed to the maximum angular speed and the calculated angle A is calculated and output sequentially. Consequently, the state between the acceleration boundary angle difference F and the deceleration boundary angle difference H is the high-speed state. After that, when the calculated angle A reaches the deceleration boundary angle difference H, deceleration is performed and the calculated angular speed S is made to agree with the angular speed ω2 output from the second rotation measuring instrument when the calculated angle A agrees with the second rotation angle R2 output from the second rotation measuring instrument.

When Q2 (R2) is behind Q1 (R1), in the manner opposite to that described above, first, deceleration processing is performed and after the advancement with the minimum angular speed, acceleration is performed so as to make the calculated angular speed S agree with the angular speed ω2 output from the second rotation measuring instrument.

The above-described explanation is given in the case where the calculated angular speed S reaches the maximum or minimum angular speed during switching processing, but there is a case where a foldback angle G is reached before the maximum or minimum angular speed is reached. In the case such as this, acceleration and deceleration are switched when the calculated angular speed S reaches the foldback angle G.

By using the terms explained above, each unit in FIG. 9 will be explained.

Figure 11:
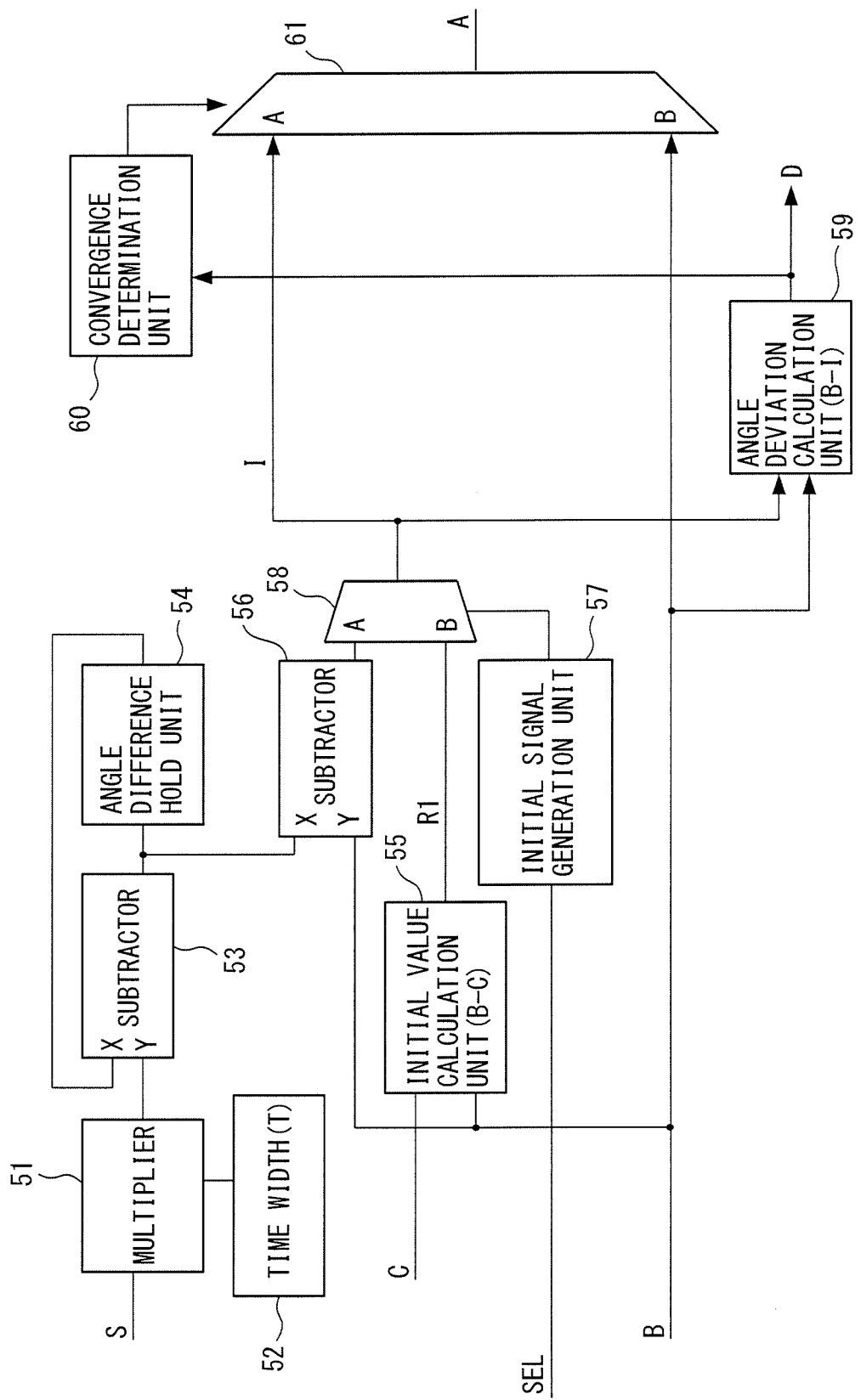
FIG. 11 is a block diagram illustrating a detailed configuration of the angle calculation unit in FIG. 9.

FIG. 11 is a block diagram illustrating a detailed configuration of the angle calculation unit 46 in FIG. 9.

The angle calculation unit 46 has a multiplier 51, a time width register 52, a subtractor 53, an angle difference hold unit 54, an initial value calculation unit 55, a subtractor 56, an initial signal generation unit 57, a selector 58, an angle deviation calculation unit 59, a convergence determination unit 60, and a selector 61. The angle calculation unit 46 generates the calculated angle A and generates the angle difference D from the switching destination.

The initial value calculation unit (B−C) 55 calculates the rotation angle R1 output from the first rotation measuring instrument at the time of switching from B, which is the rotation angle of the switching destination, and the angle difference C at the time of switching.

The initial signal generation unit 57 generates an initial signal that is effective only during the period of time during which the first interpolation processing at the time of switching is performed in accordance with the selection signal SEL.

The selector 58 selects the B side during the period of time during which the initial signal is effective and selects the A during other periods of time. Consequently, the selector 58 outputs R1 only in the first interpolation processing at the time of switching and after that, outputs the angle difference at that point of time output from the subtractor 56 as an angle I during switching.

The angle deviation calculation unit (B−I) 59 calculates the difference between B, which is the rotation angle of the switching destination, and the angle I during switching and outputs the difference as the angle difference D during switching.

The determination unit 60 outputs a switching signal of the selector 60. This switching signal controls the selector 60 so as to select the B side at the initial time and after convergence and to select the A side in the meantime to output as the calculated angle A. The determination unit 60 determines whether the angle difference D during switching has converged within the range set in advance. Consequently, even in the case where the angle convergence is not perfect due to an error in calculation, the calculated angle is switched to B, i.e., to R2.

The multiplier 51 calculates the rotation angle during a unit control period T by multiplying the calculated angular speed S during switching by the unit control period T held in the time width register 52.

The subtractor 53 calculates the angle difference at that point of time by subtracting the amount of rotation angle output from the multiplier 51 from the previous time angle difference held in the angle difference hold unit 54.

The angle difference hold unit 54 holds the angle difference C at the time of start of switching and then updates the value to be held so as to hold the angle difference at that point of time output from the subtractor 53 after that.

The subtractor 56 finds the calculated angle at that point of time by subtracting the angle difference at that point of time output from the subtractor 53 from the rotation angle R1 of the switching destination.

As described above, by subtracting the amount of rotation corresponding to the calculated angular speed S during the unit control period T from the previous time angle difference, the calculated angle at that point of time is found. The calculated angle at that point of time thus found is output as the calculated angle A via the selector 58 and the selector 61 during the interpolation switching processing and after convergence, the rotation angle R2 of the switching destination is output as the calculated angle A.

Figure 12:
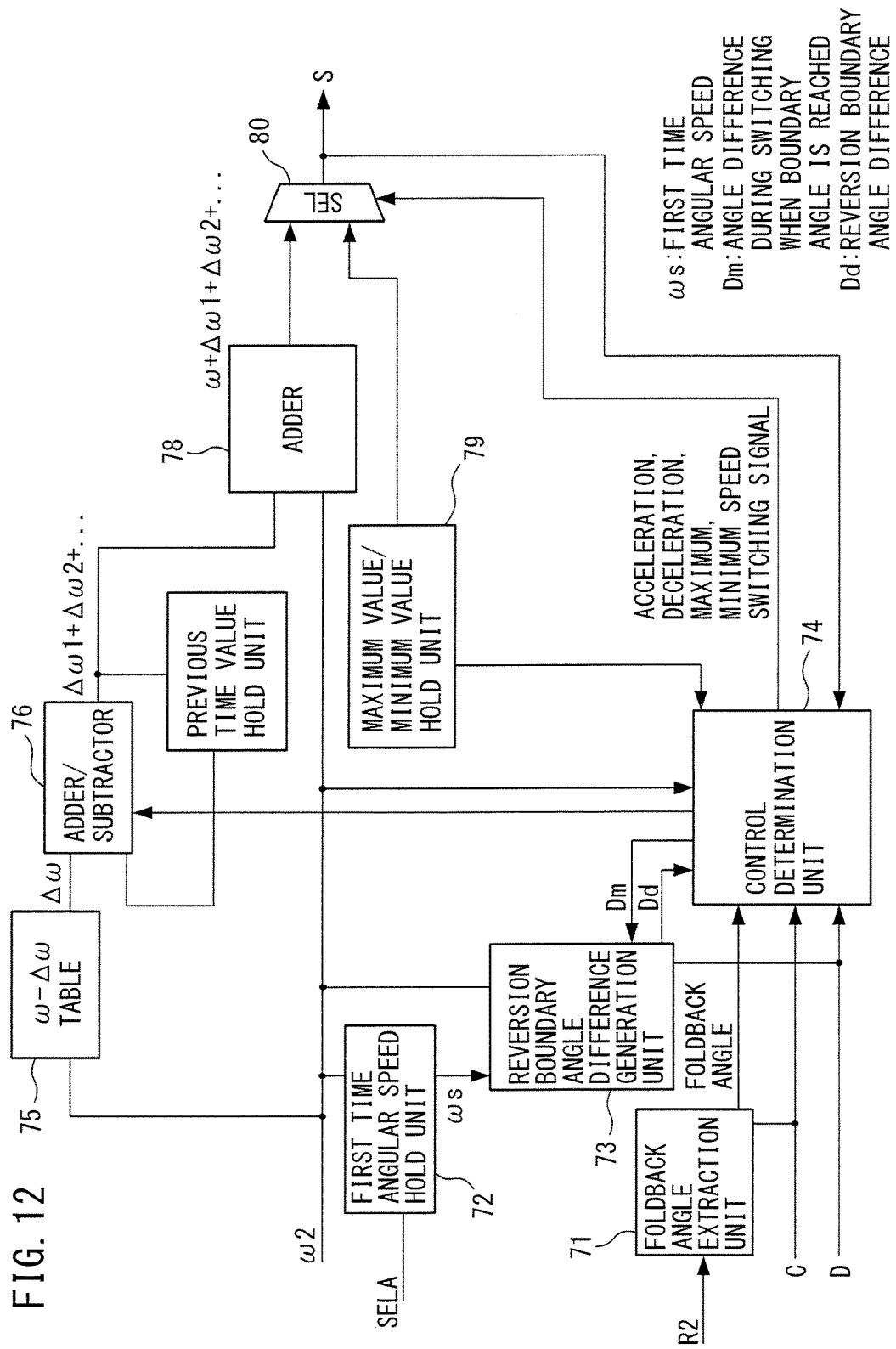
FIG. 12 is a block diagram illustrating a detailed configuration of the angular speed calculation unit in FIG. 9.

FIG. 12 is a block diagram illustrating a detailed configuration of the angular speed calculation unit 45 in FIG. 9. The angular speed calculation unit 45 generates the calculated angular speed S during switching and changes the calculated angular speed S during switching to the acceleration state, the high-speed state, and the deceleration state, and thereby achieves a reduction in the switching time without affecting the motor control system.

The angular speed calculation unit 45 has a foldback angle extraction unit 71, a first time angular speed hold unit 72, a reversion boundary angle difference generation unit 73, a control determination unit 74, an ω−Δω table 75, an adder/subtractor 76, a previous time value hold unit 77, an adder 78, a maximum value/minimum value hold unit 79, and a selector 80.

The foldback angle extraction unit 71 and the reversion boundary angle difference generation unit 73 will be described later.

The first time angular speed hold unit 72 latches the rotation angular speed ω2 output from the second rotation measuring instrument of the switching destination at the time of switching in accordance with a selection switching signal SELA and holds as the first time angular speed ωs.

The ω−Δω table 75 is a table storing the relationship in FIG. 8 and Δω is generated from ω2. The reason is that it is predicted that Δω that does not affect the motor control system differs depending on the angular speed. Further, as the angular speed ω, it is made possible to use a new value for each control unit, and due to this, it is also possible to follow the case where the angular speed ω changes during switching.

The adder/subtractor 76 calculates new acceleration from Δω and the previous time angular speed held in the previous time value hold unit 77. By adding Δω for each unit control period T, the acceleration state is brought close to the high-speed state. In the case of deceleration, a minus value is added. As described above, the adder/subtractor 76 and the previous time value hold unit 77 sequentially generate Δω1, Δω1+Δω2, Δω1+Δω2+ . . . . The control of whether the arithmetic operation of the adder/subtractor 76 is addition or subtraction is performed by the control determination unit 74.

The adder 78 adds ω and Δω1+Δω2+ . . . .

In the manner described above, the angular speed during the period of acceleration and that during the period of deceleration are generated.

The maximum value/minimum value hold unit 79 holds the maximum value ωMAX and the minimum value ωMIN in the motor control and outputs the maximum value ωMAX when R2 is ahead of R1 and outputs the minimum value ωMIN when R2 is behind R1.

The control determination 74 performs control of the adder/subtractor 76 described previously and selection control of the calculated angular speed S during switching in the selector 80.

The selector 80 selects one of ω+Δω1+Δω2+ . . . and the maximum value (minimum value) based on the control of the control determination unit 74 and outputs as the calculated angular speed S during switching.

The reversion boundary angle difference generation unit 73 has a configuration in FIG. 13, to be described later, and generates the deceleration or acceleration boundary angle difference in accordance with the change in angular speed. For example, in the case of transition from the high-speed state to the deceleration state, the deceleration boundary angle difference is generated. When the angle difference during switching reaches the deceleration boundary angle, deceleration is started.

The foldback angle extraction unit 71 has a configuration in FIG. 14, to be described later, and generates the foldback angle.

Figure 13:
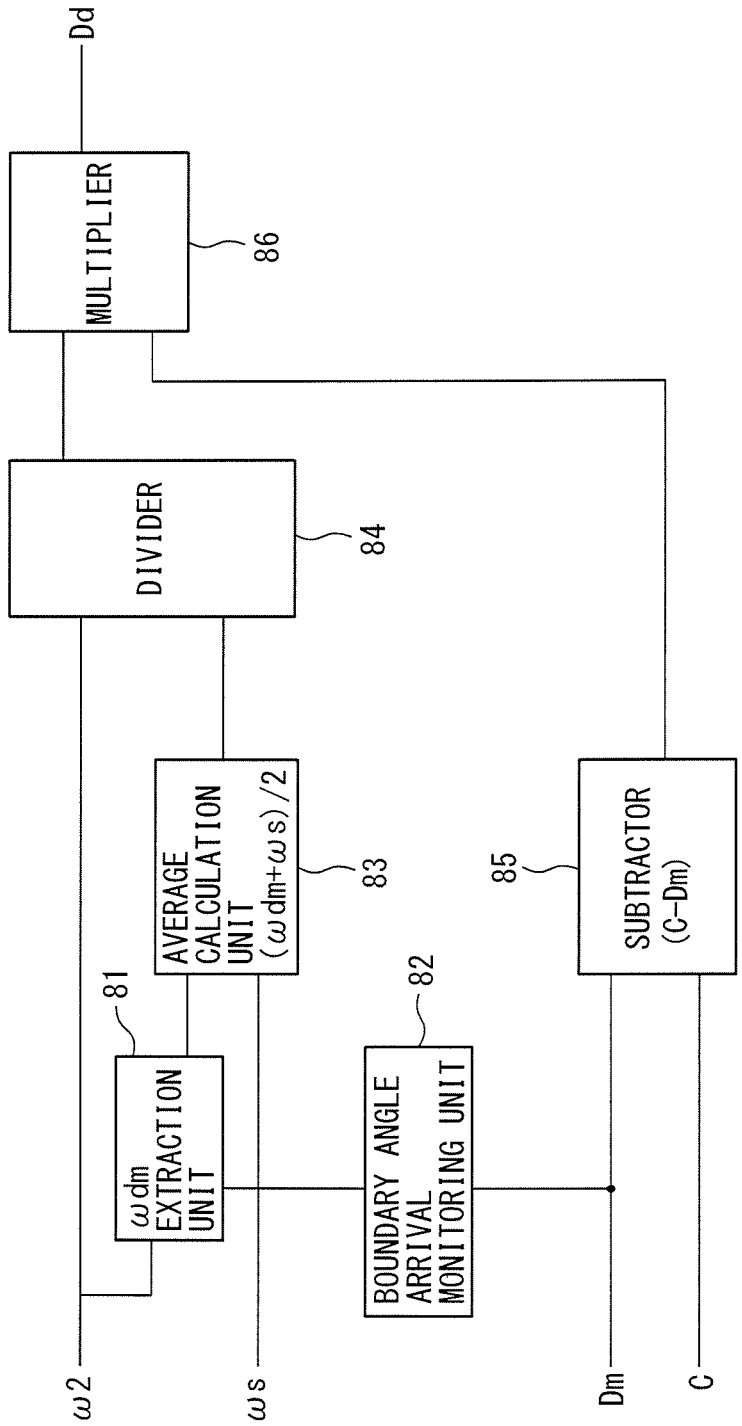
FIG. 13 is a diagram illustrating a configuration of the reversion boundary angle difference generation unit.

FIG. 13 is a diagram illustrating a configuration of the reversion boundary angle difference generation unit 73.

The reversion boundary angle difference generation unit 73 has an ωdm extraction unit 81, a boundary angle arrival monitoring unit 82, an average calculation unit 83, a divider 84, a subtractor 85, and a multiplier 86.

The boundary angle arrival monitoring unit 82 monitors whether the angle difference Dm during switching has reached the boundary angle and outputs an arrival signal when reached.

The ωdm extraction unit 81 monitors the second rotation angular speed ω2 output from the second rotation measuring instrument and extracts the second rotation angular speed ωdm when the arrival signal is output.

The average calculation unit 83 calculates an average (ωdm+ωs)/2 of the angular speed ωs at the time of start of switching of the second rotation angular speed ω2 and ωdm.

The divider 84 calculates the correction term described previously by dividing the second rotation angular speed ω2 by the average (ωdm+ωs)/2 described above.

The subtractor 85 calculates the acceleration (deceleration) boundary angle difference by subtracting Dm from the angle difference C at the time of switching.

The multiplier 86 calculates the acceleration (deceleration) boundary angle difference by multiplying the acceleration (deceleration) boundary angle difference by the correction term and outputs as a reversion boundary angle Dd.

Figure 14:
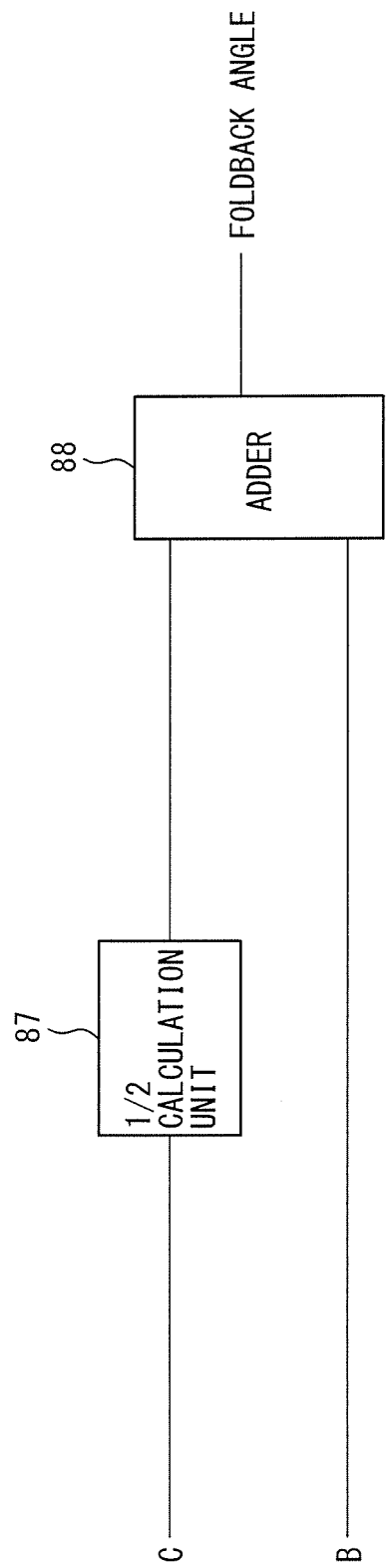
FIG. 14 is a diagram illustrating a configuration of the foldback angle extraction unit.

FIG. 14 is a diagram illustrating a configuration of the foldback angle extraction unit 71. The foldback angle extraction unit 71 generates the foldback angle.

The foldback angle extraction unit 71 has a ½ calculation unit 87 configured to calculate ½ of the angle difference C at the time of switching and an adder 88 configured to add the output of the ½ calculation unit 87 and the angle B of the switching destination.

Figure 15:
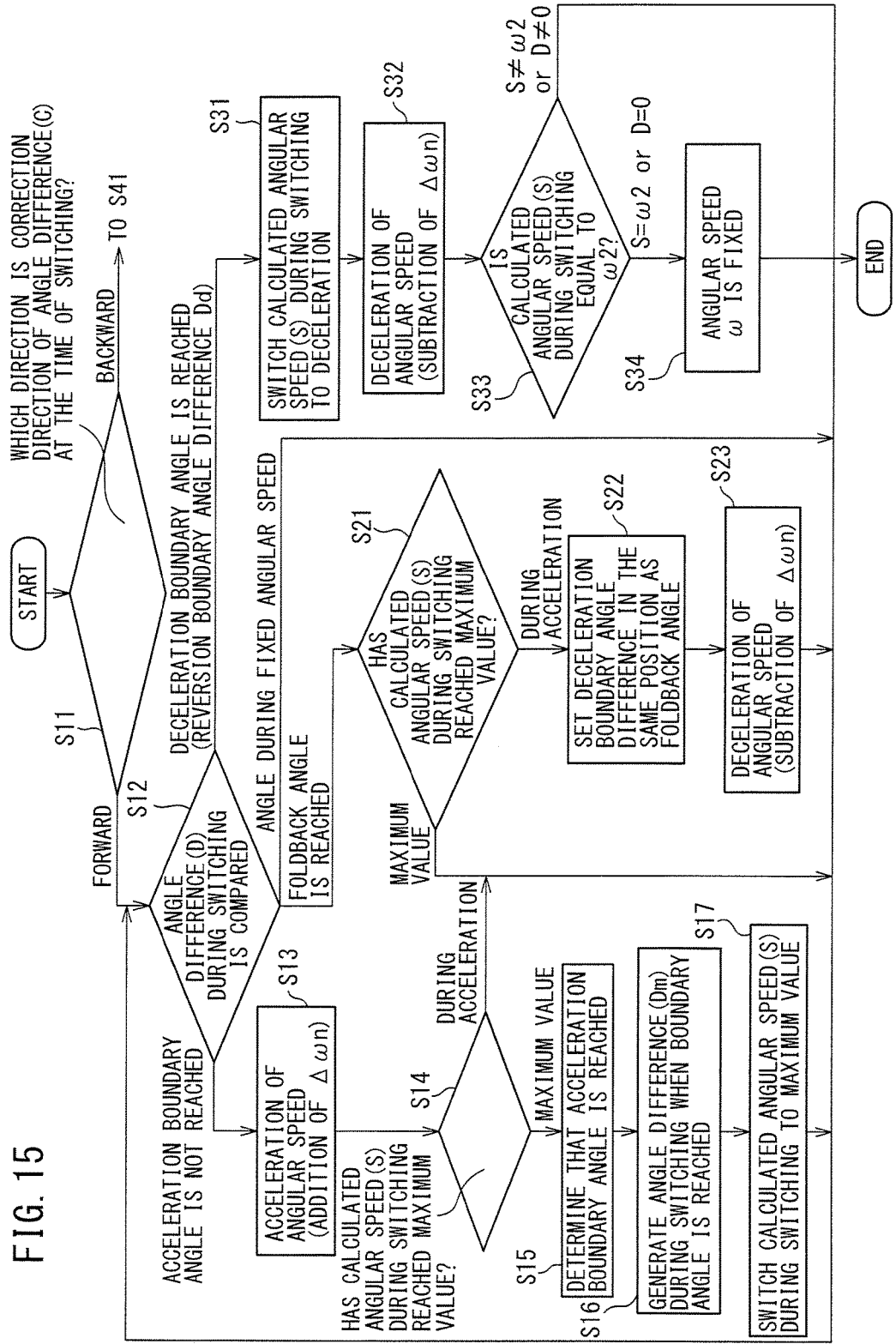

FIG. 15 and FIG. 16 are a flowchart showing a control flow of the control determination unit 74 in FIG. 12. With reference to FIG. 15 and FIG. 16, the control of the control determination unit 74 is explained.

Signals input to the control determination unit 74 are five signals as follows.

Angle difference D during switching
Angle difference C at the time of switching
Calculated angular speed S during switching
Angular speed ω2 of the switching destination
Reversion boundary angle difference Dd Pieces of output information from the control determination unit 74 are two pieces of information as follows.

Selection signal of the selector 80 (acceleration, deceleration, maximum speed switching, minimum speed switching)
Control signal of the adder/subtractor 76

Further, the control determination unit 74 generates the angle difference Dm from the switching destination when the boundary angle is reached.

At step S11, whether the correction direction is the forward direction or the backward direction is determined from the angle difference C at the time of switching and in the case of the forward direction, the processing proceeds to step S12 and in the case of the backward direction, the processing proceeds to step S41.

At step S12, the angle difference D during switching is compared with the acceleration boundary angle, the foldback angle, and the deceleration boundary angle, and the angular speed and the maximum angular speed are compared. If the acceleration boundary angle is not reached, the processing proceeds to step S13. If the acceleration boundary angle is reached, but the foldback angle is reached, the processing proceeds to step S21. If the maximum angular speed ωMAX has already been exceeded and a fixed angular speed is reached, the processing returns to S12. If the deceleration boundary angle (reversion boundary limit angle difference Dd) is reached, the processing proceeds to step S31.

At step S13, the calculated angular speed S during switching is generated by adding Δωn to the second rotation angular speed ω2 at that point of time (by performing acceleration).

At step S14, whether the calculated angular speed S during switching has reached the maximum value is determined and in the case where the maximum value is reached, the processing proceeds to step S15 and in the case where not, the processing returns to S12.

At step S15, it is determined that the acceleration boundary angle is reached.

At step S16, the angle difference D during switching is determined to be the angle Dm during switching when the acceleration boundary angle is reached.

At step S17, the calculated angular speed S during switching is switched to the maximum value (ωMAX) and the processing returns to S12.

At step S21, whether the calculated angular speed S during switching has reached the maximum value (ωMAX) is determined and if reached, the processing returns to S12 and if not reached and during acceleration, the processing proceeds to step S22.

At step S22, the deceleration boundary angle difference is set in the same position as the foldback angle.

At step S23, the calculated angular speed S during switching is generated by subtracting Δωn from the second rotation angular speed ω2 at that point of time (by performing deceleration) and then the processing returns to S12.

At step S31, the processing is switched to the deceleration processing for the calculated angular speed S during switching.

At step S32, the calculated angular speed S during switching is generated by subtracting Δωn from the second rotation angular speed ω2 at that point of time (by performing deceleration).

At step S33, whether the calculated angular speed S during switching is equal to ω2 output from the second rotation measuring instrument, and whether the angle difference D during switching is equal to 0 is determined and if S=ω2 or D=0, the processing proceeds to step S34 and if S≠ω2 or D≠0, the processing returns to step S41.

On the other hand, in the case where it is determined that the direction is the backward direction at step S11, the processing proceeds to step S41.

At step S41, the angle difference D during switching is compared with the deceleration boundary angle, the foldback angle, and the acceleration boundary angle, and the angular speed and the minimum angular speed are compared. If the deceleration boundary angle is not reached, the processing proceeds to step S42. If the deceleration boundary angle is reached, but the foldback angle is reached, the processing proceeds to step S51. If the minimum angular speed ωMIN has already been exceeded and a fixed angular speed is reached, the processing returns to S41. If the acceleration limit angle (reversion boundary angle difference Dd) is reached, the processing proceeds to step S61.

At step S42, the calculated angular speed S during switching is generated by subtracting Δωn from the second rotation angular speed ω2 at that point of time (by performing deceleration).

At step S43, whether the calculated angular speed S during switching has reached the minimum value is determined and if reached, the processing proceeds to step S44 and if not, the processing returns to S41.

At step S44, it is determined that the deceleration boundary angle is reached.

At step S45, the angle difference D during switching is determined to be the angle Dm during switching when the deceleration boundary angle is reached.

At step S46, the calculated angular speed S during switching is switched to the minimum value (ωMIN) and the processing returns to S41.

At step S51, whether the calculated angular speed S during switching has reached the minimum value (ωMIN) is determined and if reached, the processing returns to S41 and if not reached and during deceleration, the processing proceeds to step S 52.

At step S52, the acceleration boundary angle difference is set in the same position as the foldback angle.

At step S53, the calculated angular speed S during switching is generated by adding Δωn to the second rotation angular speed ω2 at that point of time (by performing acceleration) and the processing returns to S41.

At step S61, the processing is switched to the acceleration processing for the calculated angular speed S during switching.

At step S62, the calculated angular speed S during switching is generated by adding Δωn to the second rotation angular speed ω2 at that point of time (by performing acceleration).

At step S63, whether the calculated angular speed S during switching is equal to ω2 output from the second rotation measuring instrument, and whether the angle difference D during switching is equal to 0 is determined and if S=ω2 or D=0, the processing proceeds to step S64 and if S≠ω2 or D≠0, the processing returns to step S41.

In the flowchart in FIG. 15 and FIG. 16 explained above, when R2 is ahead of R1 and when the state is the acceleration state, S12 and S13 to S17 are performed and in the high-speed state, the processing returns directly to S12 from S12, and in the deceleration state, S12 and S31 to S34 are performed. When R2 is behind R1 and when the state is in the deceleration state, S41 and S42 to S46 are performed and in the low-speed state, the processing returns directly to S41 from S41, and in the acceleration state, S41 and S61 to S64 are performed.

The switching interpolation unit may be implemented by a hardware circuit or may be implemented by software processing that utilizes a computer, a DSP, etc.

According to the angle detection device of the embodiment explained above, the configuration is a redundant configuration in which the rotation of the same rotation shaft is measured by a plurality of rotation measuring instruments (resolvers) and when an anomaly occurs in one of the instruments, the failed instrument is switched to another, and switching is performed at a high speed in such a manner that the influence on the control system that utilizes an output signal is small. Due to this, in the motor control system, it is possible to use the control sequence used hitherto without the need to change the design and it is possible to apply the motor control system also to a rotating body that rotates at a high speed and the rotation speed of which varies when necessary.

As above, the embodiments are explained, but all of the examples and conditions described here are described for the purpose of aiding understanding of the concept of the invention applied to the invention and the technologies. In particular, the described examples and conditions are not intended to limit the scope of the invention and the configurations in such examples of the specification are not intended to indicate advantages or disadvantages of the invention. The embodiments of the invention are described in detail, but it should be understood that various modifications, substitutions, and alterations can be made without deviating from the spirit and the scope of the invention.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a illustrating of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An angle detection device comprising:
a first rotation measuring instrument configured to output a first angle signal and a first angular speed signal related to a rotation angle of a rotating body;
a second rotation measuring instrument configured to output a second angle signal and a second angular speed signal related to the rotation angle of the rotating body;
an anomaly detection unit configured to monitor signals in the first and second rotation measuring instruments and to detect occurrence of an anomaly in the first rotation measuring instrument and occurrence of an anomaly in the second rotation measuring instrument; and
a switching interpolation unit configured to select one of a first set including the first angle signal and the first angular speed signal and a second set including the second angle signal and the second angular speed signal and output the selected one of the first set and the second set as a third angle signal and a third angular speed signal, the switching interpolation circuit being configured to select and output the first angle signal and the first angular speed signal as the third angle signal and the third angular speed signal when the first rotation measuring instrument is normal, the switching interpolation circuit being configured, when the second rotation measuring instrument is normal and an anomaly has occurred in the first rotation measuring instrument, to perform switching so that the second angle signal and the second angular speed signal are output as the third angle signal and the third angular speed signal and to perform interpolation so that the difference between the first angle signal and the second angle signal is reduced stepwise.

2. The angle detection device according to claim 1, wherein
the switching interpolation unit is configured to perform interpolation so that a change rate of the third angle signal output at the time of switching does not exceed a threshold.

3. The angle detection device according to claim 2, wherein
the switching interpolation unit is configured to perform processing having an acceleration stage in which the change rate of the third angle signal is increased in the direction in which the difference between the first angle signal and the second angle signal is reduced and a deceleration stage in which the change rate of the third angle signal is reduced after the acceleration stage.

4. The angle detection device according to claim 3, wherein
the switching interpolation unit is configured to perform processing having a high-speed stage in which the change rate of the third angle signal is set to a value close to the threshold between the acceleration stage and the deceleration stage.

5. The angle detection device according claim 1, wherein the first and second rotation measuring instruments include resolvers.

6. An angle detection method comprising:
detecting, by a first rotation measuring instrument, a rotation angle of a rotating body and generating a first angle signal and a first angular speed signal;
detecting, by a second rotation measuring instrument, the rotation angle of the rotating body and generating a second angle signal and a second angular speed signal;
monitoring signals in the first and second rotation measuring instruments and detecting occurrence of an anomaly in the first rotation measuring instrument and occurrence of an anomaly in the second rotation measuring instrument;
outputting the first angle signal and the first angular speed signal as a third angle signal and a third angular speed signal when the first rotation measuring instrument is normal; and
when the second rotation measuring instrument is normal and an anomaly has occurred in the first rotation measuring instrument, performing switching so that the second angle signal and the second angular speed signal are output as the third angle signal and the third angular speed signal and performing interpolation so that the difference between the first angle signal and the second angle signal is reduced stepwise.

7. The angle detection method according to claim 6, wherein
the interpolation is performed so that the change rate of the third angle signal output at the time of switching does not exceed a threshold.

8. The angle detection method according to claim 7, wherein
the interpolation processing has an acceleration stage in which a change rate of the third angle signal is increased in the direction in which the difference between the first angle signal and the second angle signal is reduced and a deceleration stage in which the change rate of the third angle signal is reduced after the acceleration stage.

9. The angle detection method according to claim 8, wherein
the interpolation processing has a high-speed stage in which the change rate of the third angle signal is set to a value close to the predetermined threshold between the acceleration stage and the deceleration stage.

10. The angle detection method according to claim 6, wherein
the first and second rotation measuring instruments include resolvers.

* * * * *